(12) United States Patent
Gao et al.

(10) Patent No.: US 11,070,804 B2
(45) Date of Patent: Jul. 20, 2021

(54) VIDEO ENCODER, A VIDEO DECODER AND CORRESPONDING METHODS WITH IMPROVED BLOCK PARTITIONING

(71) Applicant: HUAWEI TECHNOLOGIES CO., LTD., Shenzhen (CN)

(72) Inventors: Han Gao, Munich (DE); Semih Esenlik, Munich (DE); Jianle Chen, Santa Clara, CA (US); Anand Meher Kotra, Munich (DE); Biao Wang, Munich (DE); Zhijie Zhao, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/005,292

(22) Filed: Aug. 27, 2020

(65) Prior Publication Data
US 2021/0006786 A1 Jan. 7, 2021

Related U.S. Application Data

(63) Continuation of application No. PCT/CN2019/106529, filed on Sep. 18, 2019.
(Continued)

(51) Int. Cl.
*H04N 19/119* (2014.01)
*H04N 19/70* (2014.01)
(Continued)

(52) U.S. Cl.
CPC ........ *H04N 19/119* (2014.11); *H04N 19/159* (2014.11); *H04N 19/176* (2014.11);
(Continued)

(58) Field of Classification Search
None
See application file for complete search history.

(56) References Cited

U.S. PATENT DOCUMENTS

| 10,715,833 | B2 * | 7/2020 | Zheng | H04N 19/70 |
| 10,742,972 | B1 * | 8/2020 | Li | H04N 19/70 |

(Continued)

FOREIGN PATENT DOCUMENTS

| CN | 104322067 A | 1/2015 |
| CN | 106559669 A | 4/2017 |

OTHER PUBLICATIONS

Benjamin, Bross et al., "Versatile Video Coding (Draft 2)", JVET-K1001-v4, Joint Video Experts Team (JVET) of ITU-T SG 16 WP 3 and ISO/IEC JTC 1/SC 29/WG 11, 11th Meeting: Ljubljana, SI, Jul. 10-18, 2018, total 86 pages.
(Continued)

*Primary Examiner* — Mohammad J Rahman
(74) *Attorney, Agent, or Firm* — Jinghua Karen Tang

(57) ABSTRACT

The present disclosure provides an encoding apparatus and a decoding apparatus, as well as an encoding method and a decoding method. In particular, the present disclosure relates to block partitioning and signaling the partitioning parameters in a bitstream. An override flag in an image region header indicates whether or not a block is to be partitioned according to a first partition constraint information. The override flag is included in the bitstream and the block is partitioned accordingly.

23 Claims, 10 Drawing Sheets

Related U.S. Application Data

(60) Provisional application No. 62/733,074, filed on Sep. 18, 2018, provisional application No. 62/742,263, filed on Oct. 5, 2018, provisional application No. 62/733,076, filed on Sep. 18, 2018.

(51) Int. Cl.
*H04N 19/176* (2014.01)
*H04N 19/96* (2014.01)
*H04N 19/159* (2014.01)
*H04N 19/186* (2014.01)

(52) U.S. Cl.
CPC ........... *H04N 19/186* (2014.11); *H04N 19/70* (2014.11); *H04N 19/96* (2014.11)

(56) References Cited

U.S. PATENT DOCUMENTS

| | | | |
|---|---|---|---|
| 2002/0087728 A1* | 7/2002 | Deshpande | H04N 21/8153 709/246 |
| 2011/0194613 A1* | 8/2011 | Chen | H04N 19/107 375/240.24 |
| 2012/0128067 A1 | 5/2012 | Liu et al. | |
| 2012/0177107 A1* | 7/2012 | Fu | H04N 19/167 375/240.03 |
| 2013/0188717 A1* | 7/2013 | Chen | H04N 19/593 375/240.16 |
| 2013/0188719 A1* | 7/2013 | Chen | H04N 19/46 375/240.16 |
| 2013/0251022 A1 | 9/2013 | Berg et al. | |
| 2013/0336399 A1* | 12/2013 | Yu | H04N 19/174 375/240.14 |
| 2015/0304670 A1* | 10/2015 | Liu | H04N 19/96 375/240.13 |
| 2016/0316200 A1* | 10/2016 | Zhang | H04N 19/182 |
| 2017/0078668 A1 | 3/2017 | Misra et al. | |
| 2017/0094277 A1 | 3/2017 | Chen et al. | |
| 2017/0195679 A1 | 7/2017 | Rapaka et al. | |
| 2017/0272758 A1* | 9/2017 | Lin | H04N 19/117 |
| 2017/0280162 A1 | 9/2017 | Zhao et al. | |
| 2018/0109812 A1* | 4/2018 | Tsai | H04N 19/647 |
| 2018/0213264 A1* | 7/2018 | Zhang | H04N 19/96 |
| 2018/0309508 A1* | 10/2018 | Regan | H04B 7/18584 |
| 2018/0367818 A1* | 12/2018 | Liu | H04N 19/513 |
| 2019/0222859 A1* | 7/2019 | Chuang | H04N 19/119 |
| 2020/0145698 A1* | 5/2020 | Gao | H04N 19/119 |
| 2020/0260070 A1* | 8/2020 | Yoo | H04N 19/103 |

OTHER PUBLICATIONS

J. An et al., Block partitioning structure for next generation video coding , ITU-T SG16 Doc. COM16-C966, Sep. 2015. total 8 pages.

ITU-T H.263(08/05), Implementors Guide, (Aug. 5, 2005), Series H: Audiovisual and Multimedia Systems Coding of moving video, Implementors Guide for H.263: "Video coding for low bit rate communication" total 10 pages.

ITU-T H.262(Feb. 2012), Information technology—Generic coding of moving pictures and associated audio information: Video: Frame packing arrangement signaling for 3D content, Amendment 4, Feb. 2012. total 238 pages.

ITU-T H.261(Mar. 1993), Line Transmission of Non-Telephone Signals, Video Codec for Audiovisual Services At p*64 kbits, total 29 pages.

ITU-T H.265(Feb. 2018), Series H: Audiovisual and Multimedia Systems Infrastructure of audiovisual services—Coding of moving video, High efficiency video coding, Feb. 2018. total 692 pages.

ITU-T H.264 Telecommunication Standardization Sector of ITU (Apr. 2017), Series H: Audiovisual and Multimedia Systems, Infrastructure of audiovisual services—Coding of moving video, Advanced video coding for generic audiovisual services, Apr. 2017. total 812 pages.

Benjamin Bross et al,"Versatile Video Coding (Draft 2)", Joint Video rts Team (JVEf) of ITU-T SG 16 WP 3 and ISO/IEC JTC 1/SC 29/WG 11, 11th Meeting: iubljana, SI, Jul. 10-18, 2018, Document: JVET-K1001-v7 , total 139 pages.

Xiaoyu Xiu et al,"Description of SDR, HDR, and 360 video coding technology proposal by InterDigital Communications and Dolby Laboratories ", Joint Video Experts Team (JVET) of ITU-T SG 16 WP 3 and ISO/IECJTC 1/SC 29/WG 11, 10th Meeting: San Diego, US, Apr. 10-20, 2018, Document: JVET-J0015-v1, total 82 pages.

* cited by examiner

VIDEO ENCODER, A VIDEO DECODER AND CORRESPONDING METHODS WITH IMPROVED BLOCK PARTITIONING

CROSS-REFERENCE TO RELATED APPLICATIONS

This application is a continuation of International Application No. PCT/CN2019/106529, filed on Sep. 18, 2019, which claims priority to U.S. Provisional Application No. 62/733,076, filed on Sep. 18, 2018 and U.S. Provisional Application No. 62/733,074, filed on Sep. 18, 2018 and U.S. Provisional Application No. 62/742,263, filed on Oct. 5, 2018. All of the aforementioned patent applications are hereby incorporated by reference in their entireties.

TECHNICAL FIELD

Embodiments of the present application generally relate to the field of video coding and more particularly to block splitting and partitioning.

BACKGROUND

Video coding (video encoding and decoding) is used in a wide range of digital video applications, for example, broadcast digital TV, video transmission over the internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265/High Efficiency Video Coding (HEVC), ITU-T H.266/Versatile video coding (VVC) and extensions, e.g. scalability and/or three-dimensional (3D) extensions, of these standards. As the video creation and use have become more and more ubiquitous, video traffic is the biggest load on communication networks and data storage, accordingly, one of the goals of most of the video coding standards was to achieve a bitrate reduction compared to its predecessor without sacrificing picture quality. Even the latest high efficiency video coding (HEVC) can compress video about twice as much as AVC without sacrificing quality. There is a need for new technology to further compress the video as compared with HEVC.

SUMMARY

Embodiments of the present application (or the present disclosure) provide apparatuses and methods for encoding and decoding according to the independent claims.

The foregoing and other objects are achieved by the subject matter of the independent claims. Further implementation forms are apparent from the dependent claims, the description and the figures.

From the standard, the definition of some feature is as following:

picture parameter set (PPS): A syntax structure containing syntax elements that apply to zero or more entire coded pictures as determined by a syntax element found in each slice header.

sequence parameter set (SPS): A syntax structure containing syntax elements that apply to zero or more entire CVSs as determined by the content of a syntax element found in the PPS referred to by a syntax element found in each slice header.

slice header: A part of a coded slice containing the data elements pertaining to the first or all bricks represented in the slice.

subpicture: An rectangular region of one or more slices within a picture.

A slice consists of either a number of complete tiles or only a consecutive sequence of complete bricks of one tile.

tile: A rectangular region of coding tree units (CTUs) within a particular tile column and a particular tile row in a picture.

A picture is divided into one or more tile rows and one or more tile columns. A tile is a sequence of CTUs that covers a rectangular region of a picture.

A tile is divided into one or more bricks, each of which consisting of a number of CTU rows within the tile.

A tile that is not partitioned into multiple bricks is also referred to as a brick. However, a brick that is a true subset of a tile is not referred to as a tile.

A slice either contains a number of tiles of a picture or a number of bricks of a tile.

A subpicture contains one or more slices that collectively cover a rectangular region of a picture.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of a brick raster scan of the slice.

According to a first aspect of the embodiments, a method is provided for decoding of a video bitstream implemented by a decoding device, wherein the video bitstream includes data representing an image region and an image region header of the image region, the decoding method comprising: obtaining an override flag from the video bitstream; when the value of the override flag is an overriding value, obtaining first partition constraint information for the image region from the image region header; and partitioning a block of the image region according to the first partition constraint information.

This approach enables each image region to have partition constraint information of itself, other than the partition constraint information for a plurality of image region in the parameter set, so this approach enables efficient bitstream parsing and, in particular, efficient partitioning constraint information signaling.

Wherein the obtaining first partition constraint information for the image region from the image region header may comprise: obtaining first partition constraint information for the image region from the data representing the image region header.

Wherein the overriding value may be preset.

Wherein the overriding value comprises true, false, 0, or 1.

Wherein the image region header may be a set or structure containing the data elements pertaining to all or part of the image region.

In a possible implementation form of the method according to the first aspect as such, the decoding method further comprises: obtaining an override enabled flag from the video bitstream, wherein the value of the override enabled flag is an enabling value.

Wherein the enabling value may be preset.

Wherein the enabling value comprises true, false, 0, or 1.

In a possible implementation form of the method according to the first aspect as such, the decoding method further comprises: obtaining an override enabled flag from the video bitstream, wherein the obtaining the override flag from the video bitstream comprises: when the value of the override enabled flag is an enabling value, obtaining the override flag from the video bitstream.

Wherein the enabling value may be preset.

Wherein the enabling value comprises true, false, 0, or 1.

With the provision of override enabled flag, the overriding may be controlled in an efficient manner, thus increasing flexibility in handling syntax elements related to block partitioning. It is noted that when the override enabled flag is set to the enabling value, the override flag may be further extracted from the bitstream. Otherwise, an override flag may not be extracted from the bitstream and no overriding is applied in such a case. Rather a second or a third partitioning constraint may be used to partition the block.

In a possible implementation form of the method according to any preceding implementation of the first aspect or the first aspect as such, the video bitstream further includes data representing a parameter set of the video bitstream, and the decoding method further comprises: when the value of the override enabled flag is a disabling value, partitioning the block of the image region according to second partition constraint information for the video bitstream. Wherein the second partition constraint information may be from the parameter set or in the parameter set.

Wherein the parameter set may be a sequence parameter set (SPS) or a picture parameter set (PPS) or any other parameter set.

Wherein the disabling value is different from the enabling value.

Wherein the disabling value may be preset.

Wherein the disabling value comprises true, false, 0, or 1.

Wherein when the value of the override enabled flag is a disabling value, the first partition constraint information may not be present in the video bitstream, and the value of the first partition constraint information may be inferred to be equal to the value of the second partition constraint information.

Wherein the parameter set may be a set or a structure containing syntax elements that apply to zero or more entire coded pictures or coded video sequence comprising the image region.

Wherein the parameter set is different from the image region header.

For example, the second partition constraint information comprises information of minimum allowed quadtree leaf node size, information of maximum multi-type tree depth, information of maximum allowed ternary tree root node size, or information of maximum allowed binary tree root node size. Any combination/subset of these and further parameters may be signaled in order to configure the partitioning constraints.

Wherein the information of minimum allowed quadtree leaf node size may be a delta value to obtain the value of minimum allowed quadtree leaf node size. For example, the information of minimum allowed quadtree leaf node size may be sps_log2_min_qt_size_intra_slices_minus2, sps_log2_min_qt_size_inter_slices_minus2, or log2_min_qt_size_minus2.

Wherein the information of maximum allowed ternary tree root node size may be a delta value to obtain the value of maximum allowed ternary tree root node size. For example, the information of maximum allowed ternary tree root node size may be sps_log2_diff_ctu_max_tt_size_intra_slices, sps_log2_diff_ctu_max_tt_size_inter_slices, or log2_diff_ctu_max_tt_size.

Wherein the information of maximum allowed binary tree root node size may be a delta value to obtain the value of maximum allowed binary tree root node size. For example, the information of maximum allowed binary tree root node size may be sps_log2_diff_ctu_max_bt_size_intra_slices, sps_log2_diff_ctu_max_bt_size_inter_slices, or log2_diff_ctu_max_bt_size.

For example, information of maximum multi-type tree depth may be sps_max_mtt_hierarchy_depth_inter_slices, sps_max_mtt_hierarchy_depth_intra_slices, or max_mtt_hierarchy_depth.

In addition or alternatively, the second partition constraint information comprises partition constraint information for a block in intra mode, or partition constraint information for a block in inter mode.

The second partition constraint information may include both the partition constraint information for blocks in intra mode and partition constraint information for blocks in inter mode signaled separately. However, the embodiments are not limited thereby and there may be one partition constraint information common for both the partition constraint information for blocks in intra mode and partition constraint information for blocks in inter mode.

Wherein the block in an intra mode, or the block in an inter mode refers to the parameter set.

Wherein the parameter set may comprise a sequence parameter set (SPS) or a picture parameter set (PPS).

Wherein the block in intra mode may be inside a CTU in a slice with slice_type equal to 2 (I) referring to the parameter set or the block in inter mode may be inside a CTU in a slice with slice_type equal to 0 (B) or 1 (P) referring to the parameter set.

In addition or alternatively, the second partition constraint information comprises partition constraint information for a luma block, and/or partition constraint information for a chroma block.

Wherein the luma block, or the chroma block refers to the parameter set.

Wherein the parameter set may comprise a sequence parameter set (SPS) or a picture parameter set (PPS).

Wherein the luma block, or the chroma block may be inside a CTU in a slice referring to the parameter set.

In a possible implementation form of the method according to any preceding implementation of the first aspect or the first aspect as such, the video bitstream further includes data representing a parameter set of the video bitstream, the obtaining an override enabled flag from the video bitstream comprises obtaining the override enabled flag from the parameter set or obtaining the override enabled flag in the parameter set.

Wherein the obtaining the override enabled flag from the parameter set may comprise obtaining the override enabled flag from the data representing the parameter set. Wherein the parameter set may be a sequence parameter set (SPS) or a picture parameter set (PPS) or any other parameter set.

In a possible implementation form of the method according to any preceding implementation of the first aspect or the first aspect as such, the obtaining the override flag from the video bitstream comprises obtaining the override flag from the image region header.

Wherein obtaining the override flag from the image region header may comprise obtaining the override flag from the data representing the image region header.

In a possible implementation form of the method according to any preceding implementation of the first aspect or the first aspect as such, the first partition constraint information comprises information of minimum allowed quadtree leaf node size, information of maximum multi-type tree depth, information of maximum allowed ternary tree root node size or information of maximum allowed binary tree root node size.

Wherein the information of minimum allowed quadtree leaf node size may be a delta value to obtain the value of minimum allowed quadtree leaf node size. For example, the information of minimum allowed quadtree leaf node size may be sps_log2_min_qt_size_intra_slices_minus2, sps_log2_min_qt_size_inter_slices_minus2, or log2_min_qt_size_minus2.

Wherein the information of maximum allowed ternary tree root node size may be a delta value to obtain the value of maximum allowed ternary tree root node size. For example, the information of maximum allowed ternary tree root node size may be sps_log2_diff_ctu_max_tt_size_intra_slices, sps_log2_diff_ctu_max_tt_size_inter_slices, or log2_diff_ctu_max_tt_size.

Wherein the information of maximum allowed binary tree root node size may be a delta value to obtain the value of maximum allowed binary tree root node size. For example, the information of maximum allowed binary tree root node size may be sps_log2_diff_ctu_max_bt_size_intra_slices, sps_log2_diff_ctu_max_bt_size_inter_slices, or log2_diff_ctu_max_bt_size.

For example, information of maximum multi-type tree depth may be sps_max_mtt_hierarchy_depth_inter_slices, sps_max_mtt_hierarchy_depth_intra_slices, or max_mtt_hierarchy_depth.

For example, the image region comprises a slice, a tile, or a subpicture, and the image region header comprises a slice header of the slice, a tile header of the tile, or a header of the subpicture.

In a possible implementation form of the method according to any preceding implementation of the first aspect or the first aspect as such, the video bitstream may further include data representing a parameter set of the video bitstream, and the decoding method further comprises: when the value of the override flag is not the overriding value, partitioning S230 the block of the image region according to second partition constraint information for the video bitstream from the parameter set or partitioning S230 the block of the image region according to second partition constraint information for the video bitstream in the parameter set.

Wherein the parameter set may be a sequence parameter set (SPS) or a picture parameter set (PPS) or any other parameter set.

Wherein the overriding value is true, the value of the override flag is not the overriding value means that the value of the override flag is false.

Wherein the overriding value is 1, the value of the override flag is not the overriding value means that the value of the override flag is 0.

According to a second aspect of the embodiments, a method for encoding of a video bitstream implemented by an encoding device, wherein the video bitstream includes data representing an image region and an image region header of the image region, the encoding method comprising: determining whether partitioning a block of the image region is according to first partition constraint information in the image region header; when determining that partitioning the block is according to the first partition constraint information, partitioning a block of the image region according to the first partition constraint information and setting the value of an override flag to an overriding value; and including the data of the override flag into the video bitstream.

In a possible implementation form of the method according to the second aspect as such, the encoding method further comprises: determining whether partitioning the block according to first partition constraint information is enabled; when determining that partitioning the block according to first partition constraint information is enabled, and setting the value of an override enabled flag to an enabling value; and including the data of the override enabled flag into the video bitstream.

Wherein the determining whether partitioning a block of the image region is according to first partition constraint information in the image region header comprises: when determining that partitioning the block according to first partition constraint information is enabled, determining whether partitioning a block of the image region is according to first partition constraint information in the image region header.

For example, the video bitstream further includes data representing a parameter set of the video bitstream, and the encoding method further comprises: when determining that partitioning the block according to first partition constraint information is not enabled, partitioning the block of the image region according to second partition constraint information for the video bitstream in the parameter set and setting the value of an override enabled flag to a disabling value.

In addition, or alternatively, the second partition constraint information comprises information of minimum allowed quadtree leaf node size, information of maximum multi-type tree depth, information of maximum allowed ternary tree root node size or information of maximum allowed binary tree root node size.

In addition, or alternatively, the second partition constraint information comprises partition constraint information for a block in intra mode, or partition constraint information for a block in inter mode.

For example, the second partition constraint information comprises partition constraint information for a luma block, or partition constraint information for a chroma block.

In a possible implementation form of the method according to any preceding implementation of the second aspect or the second aspect as such, the video bitstream further includes data representing a parameter set of the video bitstream, the override enabled flag is in the parameter set.

For instance, the override flag is in the image region header.

In addition or alternative to any of the embodiments, the first partition constraint information comprises information of minimum allowed quadtree leaf node size, information of maximum multi-type tree depth, information of maximum allowed ternary tree root node size or information of maximum allowed binary tree root node size.

In addition or alternatively to any of the embodiments, the image region comprises a slice, a tile, or a subpicture, and the image region header comprises a slice header of the slice, a tile header of the tile, or a header of the subpicture.

For example, the video bitstream further includes data representing a parameter set of the video bitstream, the decoding method further comprises: when determining that partitioning the block is not according to the first partition constraint information, partitioning (S360) the block of the image region according to second partition constraint information for the video bitstream in the parameter set, and setting the value of the override flag to not overriding value.

The method according to the second aspect can be extended into implementation forms corresponding to the implementation forms of the first apparatus according to the first aspect. Hence, an implementation form of the method comprises the feature(s) of the corresponding implementation form of the first apparatus.

The advantages of the methods according to the second aspect are the same as those for the corresponding implementation forms of the first apparatus according to the first aspect.

According to a third aspect of the embodiments, a decoder is provided, comprising: one or more processors; and a non-transitory computer-readable storage medium coupled to the processors and storing programming for execution by the processors, wherein the programming, when executed by the processors, configures the decoder to carry out any of the above mentioned decoding methods according to the first aspect or any possible implementation of the first aspect.

According to a fourth aspect of the embodiments, an encoder is provided, comprising: one or more processors; and a non-transitory computer-readable storage medium coupled to the processors and storing programming for execution by the processors, wherein the programming, when executed by the processors, configures the encoder to carry out the method according to any of the above mentioned decoding methods according to the second aspect or any possible implementation of the second aspect.

According to a fifth aspect, a computer-readable storage medium having stored thereon instructions that when executed cause one or more processors configured to code video data is proposed. The instructions cause the one or more processors to perform a method according to the first or second aspect or any possible implementation of the first or second aspect.

According to a sixth aspect, the embodiments relates to a computer program comprising program code for performing the method according to the first or second aspect or any possible embodiment of the first or second aspect when executed on a computer.

According to a seventh aspect of the embodiments, a decoder is provided for decoding a video bitstream, wherein the video bitstream includes data representing an image region and an image region header of the image region, the decoder comprising: an override determination unit for obtaining an override flag from the video bitstream; a partition constraint determination unit for, when the value of the override flag is an overriding value, obtaining first partition constraint information for the image region from the image region header; and a block partitioning unit for partitioning a block of the image region according to the first partition constraint information The method according to the first aspect of the embodiments can be performed by a decoder according to the seventh aspect of the embodiments. Further features and implementation forms of the decoder according to the third aspect of the embodiments correspond to the features and implementation forms of the method according to the first aspect of the embodiments or any possible implementation of the first aspect. According to an eighth aspect of the embodiments, an encoder is provided for encoding a video bitstream, wherein the video bitstream includes data representing an image region and an image region header of the image region, the encoder comprising: a block partitioning unit for partitioning a block of the image region according to first partition constraint information; a bitstream generator for inserting first partition constraint information for the image region into the image region header and set the value of an override flag to an overriding value; and for inserting the override flag into the video bitstream.

The method according to the second aspect of the embodiments can be performed by the encoder according to the eighth aspect of the embodiments. Further features and implementation forms of the encoder according to the eighth aspect of the embodiments correspond to the features and implementation forms of the method according to the second aspect of the embodiments or any possible implementation of the second aspect.

For the purpose of clarity, any one of the embodiments disclosed herein may be combined with any one or more of the other embodiments to create a new embodiment within the scope of the present disclosure.

According to a ninth aspect of the embodiments, a video bitstream is provided, wherein the video bitstream includes data representing an image region and an image region header of the image region, the video bitstream further includes an override flag specifying whether first partition constraint information for the image region is present in the image region header.

In a possible implementation form of the method according to the ninth aspect as such, the video bitstream further includes an override enabled flag specifying whether the override flag is present in the image region header.

In a possible implementation form of the method according to any preceding implementation of the first aspect or the first aspect as such, the override enabled flag is in the parameter set or data representing the parameter set.

In a possible implementation form of the method according to any preceding implementation of the first aspect or the first aspect as such, the override flag is in the image region header or data representing the image region header.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the invention are described in more detail with reference to the attached FIGS and drawings, in which.

Figure 1A:
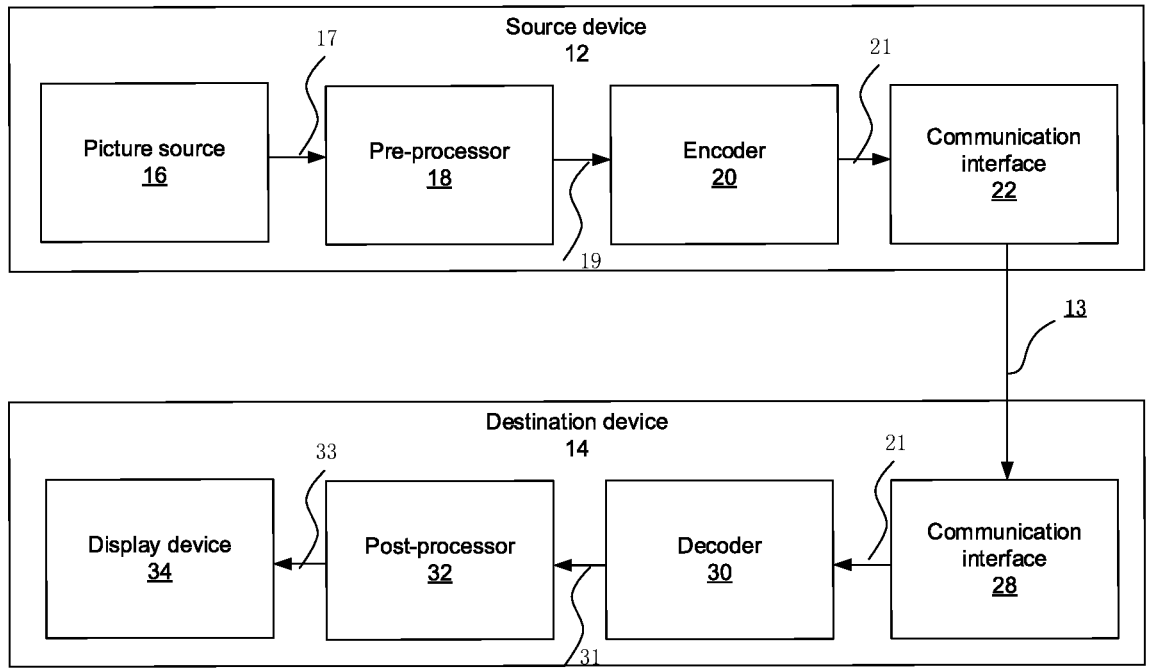
FIG. 1A is a block diagram showing an example of a video coding system configured to implement embodiments of the invention.

In the following, identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, aspects of embodiments of the invention or aspects in which embodiments of the present invention may be used. It is understood that embodiments of the invention may be used in other aspects and comprise structural or logical changes not depicted in the FIGS. The following detailed description, therefore, is not to be taken in a limiting sense, and the scope of the present invention is defined by the appended claims.

For instance, it is understood that disclosure in connection with a described method may also hold true for a corresponding device or system configured to perform the method and vice versa. For example, if one or a plurality of method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the FIG. s. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the FIGS. Further, it is understood that the features of the various exemplary embodiments and/or aspects described herein may be combined unless specifically noted otherwise.

Video coding typically refers to the processing of a sequence of pictures, which form the video or video sequence. Instead of the term "picture" the term "frame" or "image" may be used as synonyms in the field of video coding. Video coding used in the present application (or present disclosure) indicates either video encoding or video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to either "encoding" or "decoding" for a video sequence. The combination of the encoding part and the decoding part is also referred to as CODEC (Coding and Decoding).

In the case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may a portion of a picture or a frame. For convenience of description, embodiments of the invention are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC. It may refer to a CU, PU, and TU. In HEVC, a CTU is split into CUs by using a quad-tree structure denoted as a coding tree. The decision of whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Qual-tree and binary tree (QTBT) partitioning frame is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition, for example, ternary tree partition was also proposed to be used together with the QTBT block structure. The term "device" may also be "apparatus", "decoder" or "encoder".

In the following embodiments of an encoder 20, a decoder 30 and a coding system 10 are described based on FIGS. 1 to 3.

FIG. 1A is a conceptional or schematic block diagram illustrating an example coding system 10, e.g. a video coding system 10 that may utilize techniques of this present application (present disclosure). Encoder 20 (e.g. Video encoder 20) and decoder 30 (e.g. video decoder 30) of a video coding system 10 represent examples of devices that may be configured to perform techniques in accordance with various examples described in the present application. As shown in FIG. 1A, the coding system 10 comprises a source device 12 configured to provide encoded data 13, e.g. an encoded picture 13, e.g. to a destination device 14 for decoding the encoded data 13.

The source device 12 comprises an encoder 20, and may additionally, i.e. optionally, comprise a picture source 16, a pre-processing unit 18, e.g. a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture). The picture source may be any kind of memory or storage storing any of the aforementioned pictures.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 16 (e.g. video source 16) may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g. from RGB to YCbCr), color correction, or de-noising. It can be understood that the pre-processing unit 18 may be optional component.

The encoder 20 (e.g. video encoder 20) is configured to receive the pre-processed picture data 19 and provide encoded picture data 21 (further details will be described below, e.g., based on FIG. 2 or FIG. 4).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder 30), and may additionally, i.e. optionally, comprise a communication interface or communication unit 28, a post-processing unit 32 and a display device 34.

The communication interface 28 of the destination device 14 is configured receive the encoded picture data 21 (or any further processed version thereof) or the encoded data 13, e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging the encoded data 13 to obtain the encoded picture data 21.

Both, communication interface 22 and communication interface 28 may be configured as unidirectional communication interfaces as indicated by the arrow for the encoded picture data 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

The encoder 20 (e.g. a video encoder 20) and the decoder 30 (e.g. a video decoder 30) each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Figure 1B:
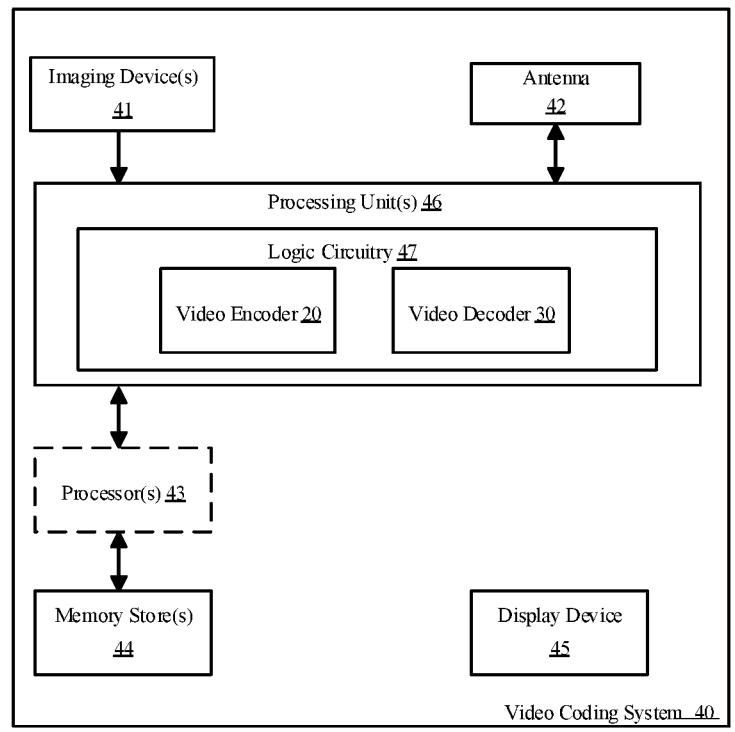
FIG. 1B is a block diagram showing another example of a video coding system configured to implement embodiments of the invention.
Figure 2:
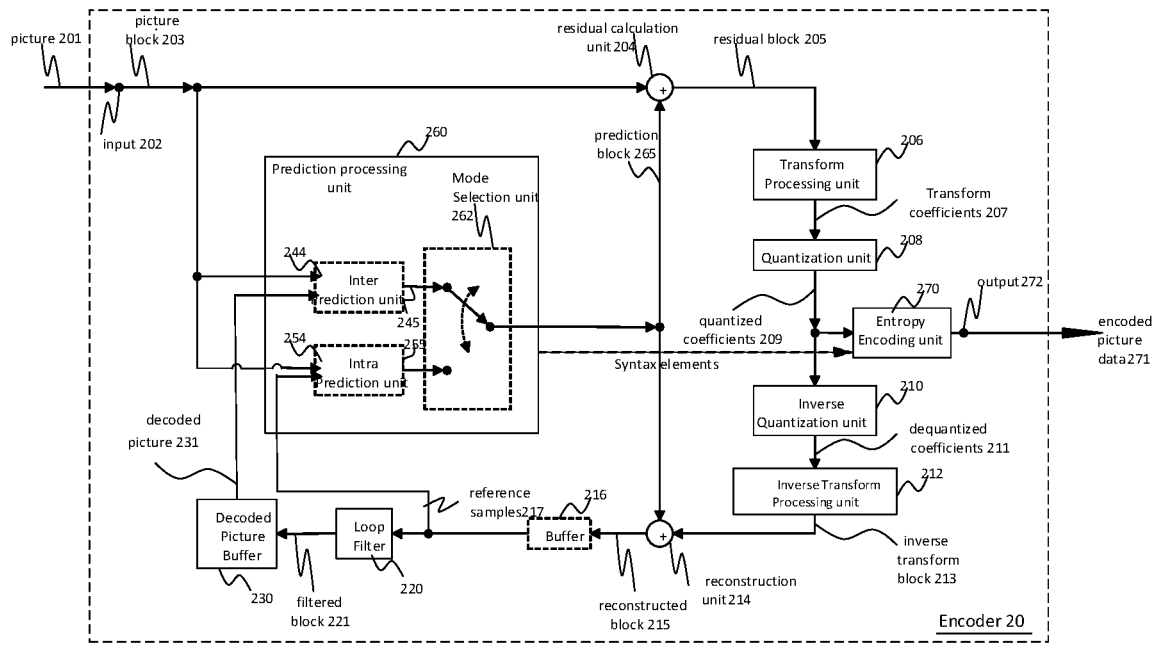
FIG. 2 is a block diagram showing an example of a video encoder configured to implement embodiments of the invention.

The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 may be referred to as a video encoding device or a video encoding apparatus. Destination device 14 may be referred to as a video decoding device or a video decoding apparatus. Source device 12 and destination device 14 may be examples of video coding devices or video coding apparatuses.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices(such as content services servers or content delivery servers), broadcast receiver device, broadcast transmitter device, or the like and may use no or any kind of operating system.

In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

It should be understood that, for each of the above examples described with reference to video encoder 20, video decoder 30 may be configured to perform a reciprocal process. With regard to signaling syntax elements, video decoder 30 may be configured to receive and parse such syntax element and decode the associated video data accordingly. In some examples, video encoder 20 may entropy encode one or more syntax elements into the encoded video bitstream. In such examples, video decoder 30 may parse such syntax element and decode the associated video data accordingly.

Figure 3:
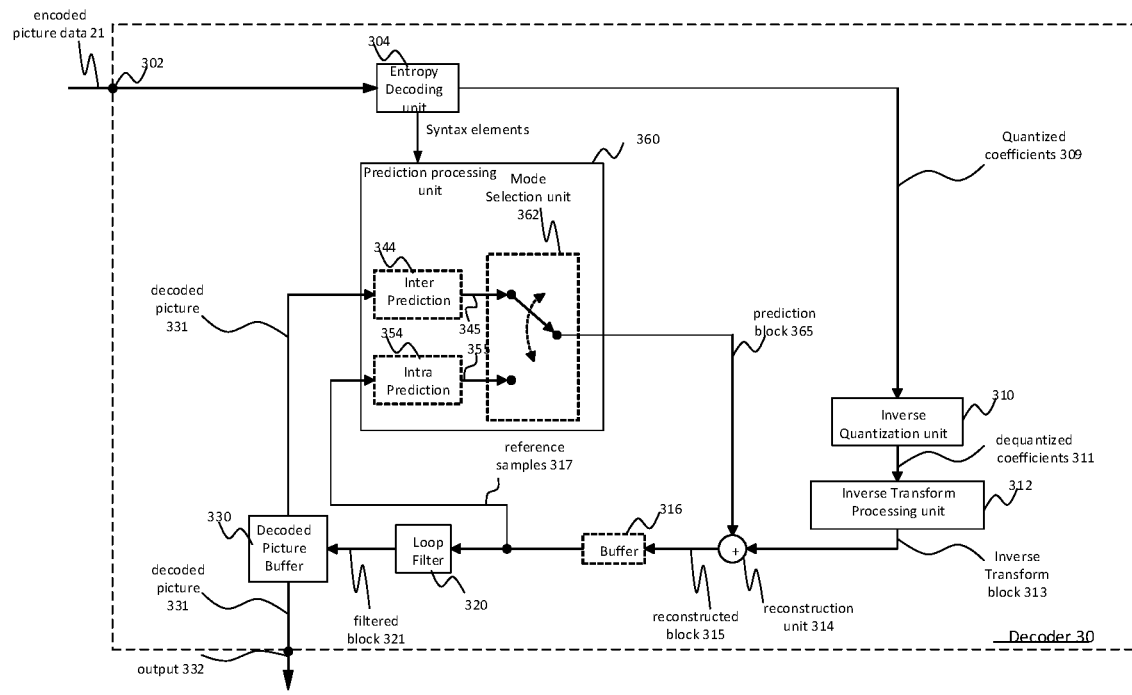
FIG. 3 is a block diagram showing an example structure of a video decoder configured to implement embodiments of the invention.

FIG. 1B is an illustrative diagram of another example video coding system 40 including encoder 20 of FIG. 2 and/or decoder 30 of FIG. 3 according to an exemplary embodiment. The system 40 can implement techniques in accordance with various examples described in the present application. In the illustrated implementation, video coding system 40 may include imaging device(s) 41, video encoder 100, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various examples.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 47 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 100 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 100 as implemented via logic circuitry 47 to embody the various modules as discussed with respect to FIG. 2 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 30 of FIG. 3 and/or any other decoder system or subsystem described herein. In some examples, video decoder 30 may be implemented via logic circuitry may include an image buffer (e.g., via either processing unit(s) 420 or memory store(s) 44)) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

FIG. 2 shows a schematic/conceptual block diagram of an example video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 30 in FIG. 3).

The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

The encoder 20 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Partitioning

Embodiments of the encoder 20 may comprise a partitioning unit (not depicted in FIG. 2) configured to partition the picture 201 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 201, e.g. one, several or all blocks forming the picture 201. The picture block 203 may also be referred to as current picture block or picture block to be coded.

In one example, the prediction processing unit 260 of video encoder 20 may be configured to perform any combination of the partitioning techniques described above.

Like the picture 201, the block 203 again is or can be regarded as a two-dimensional array or matrix of samples with intensity values (sample values), although of smaller dimension than the picture 201. In other words, the block 203 may comprise, e.g., one sample array (e.g. a luma array in case of a monochrome picture 201) or three sample arrays (e.g. a luma and two chroma arrays in case of a color picture 201) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Encoder 20 as shown in FIG. 2 is configured encode the picture 201 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video encoder 20 as shown in FIG. 2 may be further configured to partition and/or encode the picture by using slices/tile groups (also referred to as video tile groups) and/or tiles (also referred to as video tiles), wherein a picture may be partitioned into or encoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 is configured to calculate a residual block 205 based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 is configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraint like scaling factors being a power of two for shift operation, bit depth of the transform coefficients, tradeoff between accuracy and implementation costs, etc. Specific scaling factors are, for example, specified for the inverse transform, e.g. by inverse transform processing unit 212, at a decoder 30 (and the corresponding inverse transform, e.g. by inverse transform processing unit 212 at an encoder 20) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 is configured to quantize the transform coefficients 207 to obtain quantized transform coefficients 209, e.g. by applying scalar quantization or vector quantization. The quantized transform coefficients 209 may also be referred to as quantized residual coefficients 209. The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g. an inverse discrete cosine transform (DCT) or inverse discrete sine transform (DST), to obtain an inverse transform block 213 in the sample domain. The inverse transform block 213 may also be referred to as inverse transform dequantized block 213 or inverse transform residual block 213.

The reconstruction unit 214 (e.g. Summer 214) is configured to add the inverse transform block 213 (i.e. reconstructed residual block 213) to the prediction block 265 to obtain a reconstructed block 215 in the sample domain, e.g. by adding the sample values of the reconstructed residual block 213 and the sample values of the prediction block 265.

Optional, the buffer unit 216 (or short "buffer" 216), e.g. a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g. intra prediction.

Embodiments of the encoder 20 may be configured such that, e.g. the buffer unit 216 is not only used for storing the reconstructed blocks 215 for intra prediction 254 but also for the loop filter unit 220 (not shown in FIG. 2), and/or such that, e.g. the buffer unit 216 and the decoded picture buffer unit 230 form one buffer. Further embodiments may be configured to use filtered blocks 221 and/or blocks or samples from the decoded picture buffer 230 (both not shown in FIG. 2) as input or basis for intra prediction 254.

The loop filter unit 220 (or short "loop filter" 220), is configured to filter the reconstructed block 215 to obtain a filtered block 221, e.g. to smooth pixel transitions, or otherwise improve the video quality. The loop filter unit 220 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

The loop filter unit 220 (or short "loop filter" 220), is configured to filter the reconstructed block 215 to obtain a filtered block 221, or in general, to filter reconstructed samples to obtain filtered sample values. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as SAO filter parameters or ALF filter parameters or LMCS parameters), e.g. directly or encoded via the entropy encoding unit 270, so that, e.g., a decoder 30 may receive and apply the same loop filter parameters or respective loop filters for decoding.

Embodiments of the encoder 20 (respectively loop filter unit 220) may be configured to output loop filter parameters (such as sample adaptive offset information), e.g. directly or entropy encoded via the entropy encoding unit 270 or any other entropy coding unit, so that, e.g., a decoder 30 may receive and apply the same loop filter parameters for decoding.

The decoded picture buffer (DPB) 230 may be a reference picture memory that stores reference picture data for use in encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The DPB 230 and the buffer 216 may be provided by the same memory device or separate memory devices. In some example, the decoded picture buffer (DPB) 230 is configured to store the filtered block 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. In some example, if the reconstructed block 215 is reconstructed but without in-loop filtering, the decoded picture buffer (DPB) 230 is configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction processing unit 260 and mode selection (e.g. by mode selection unit 262) performed by an example encoder 20 will be explained in more detail.

Figure 17:
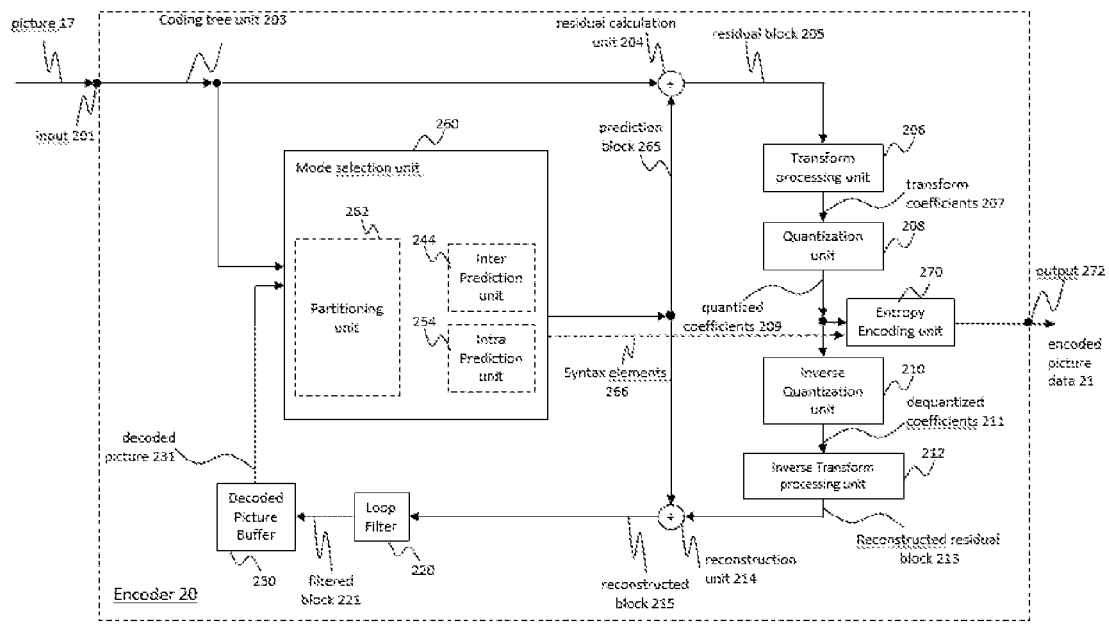
FIG. 17 is a block diagram showing an example of a video encoder configured to implement embodiments of the invention.

In addition or alternatively to the above-mentioned embodiments, in another embodiments according to FIG. 17, the mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition a picture from a video sequence into a sequence of coding tree units (CTUs), and the CTU 203 may be further partitioned into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may be configured to partition a picture from a video sequence into a sequence of coding tree units (CTUs), and the partitioning unit 262 may partition (or split) a coding tree unit (CTU) 203 into smaller partitions, e.g. smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing versatile video coding (VVC), but it can be specified to be value rather than 128×128 in the future, for example, 256×256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile. There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quadtree structure similar to the coding tree for the CU.

Figure 6:
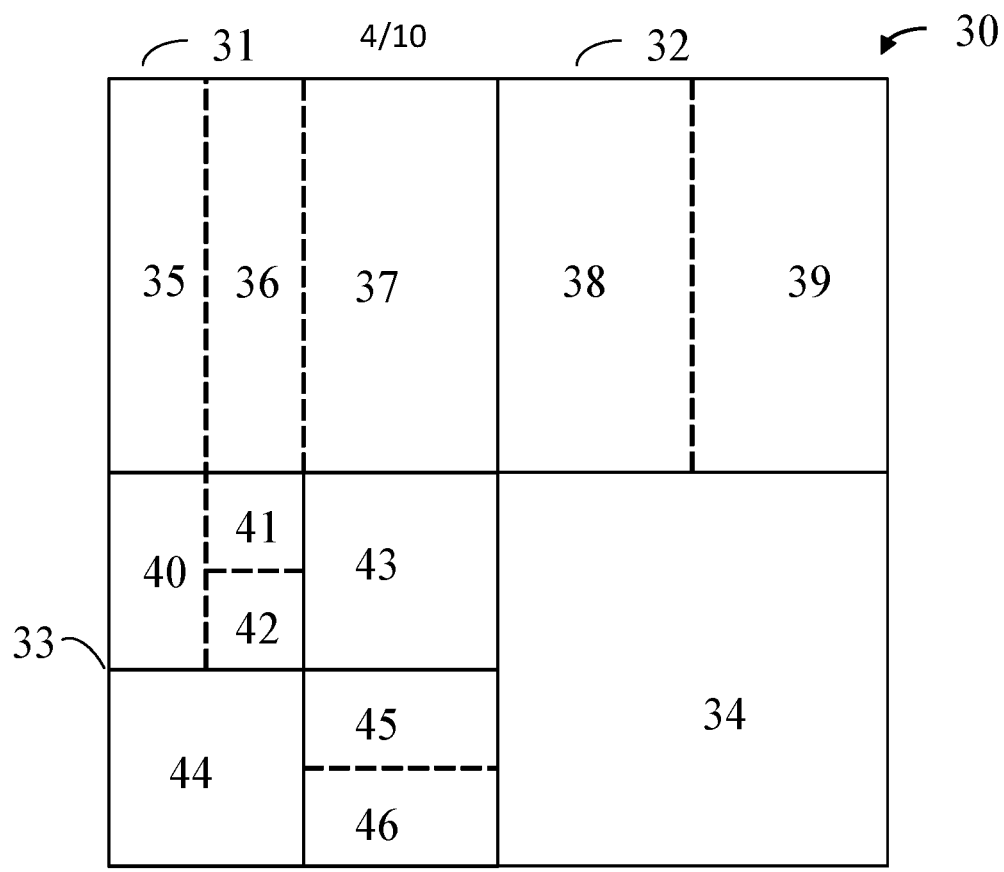
FIG. 6 is an illustrative diagram of an example of block partitioning using a quad-tree-binary-tree (QTBT) structure.

In embodiments, e.g., according to the latest video coding standard currently in development, which is referred to as Versatile Video Coding (VVC), a combined Quad-tree nested multi-type tree using binary and ternary splits segmentation structure for example used to partition a coding tree unit. In the coding tree structure within a coding tree unit, a CU can have either a square or rectangular shape. For example, the coding tree unit (CTU) is first partitioned by a quaternary tree. Then the quaternary tree leaf nodes can be further partitioned by a multi-type tree structure. There are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.VVC develops a unique signaling mechanism of the partition splitting information in quadtree with nested multi-type tree coding tree structure. In the signalling mechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64, as shown in FIG. 6. TT split is also forbidden when either width or height of a chroma coding block is larger than 32. The pipelining design will divide a picture into Virtual pipeline data units s(VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.s In addition, it should be noted that, when a portion of a tree node block exceeds the bottom or right picture boundary, the tree node block is forced to be split until the all samples of every coded CU are located inside the picture boundaries.

As an example, the Intra Sub-Partitions (ISP) tool may divide luma intra-predicted blocks vertically or horizontally into 2 or 4 sub-partitions depending on the block size.

In one example, the mode selection unit 260 of video encoder 20 may be configured to perform any combination of the partitioning techniques described herein.

As described above, the encoder 20 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g. non-directional modes like DC (or mean) mode and planar mode, or directional modes, e.g. as defined in H.265, or may comprise 67 different intra-prediction modes, e.g. non-directional modes like DC (or mean) mode and planar mode, or directional modes, e.g. as defined for VVC. As an example, several conventional angular intra prediction modes are adaptively replaced with wide-angle intra prediction modes for the non-square blocks, e.g. as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel, quarter-pel and/or 1/16 pel interpolation, or not.

Additional to the above prediction modes, skip mode, direct mode and/or other inter prediction mode may be applied.

For example, Extended merge prediction, the merge candidate list of such mode is constructed by including the following five types of candidates in order: Spatial MVP from spatial neighbor CUs, Temporal MVP from collocated CUs, History-based MVP from an FIFO table, Pairwise average MVP and Zero MVs. And a bilateral-matching based decoder side motion vector refinement (DMVR) may be applied to increase the accuracy of the MVs of the merge mode. Merge mode with MVD (MMVD), which comes from merge mode with motion vector differences. A MMVD flag is signaled right after sending a skip flag and merge flag to specify whether MMVD mode is used for a CU. And a CU-level adaptive motion vector resolution (AMVR) scheme may be applied. AMVR allows MVD of the CU to be coded in different precision. Dependent on the prediction mode for the current CU, the MVDs of the current CU can be adaptively selected. When a CU is coded in merge mode, the combined inter/intra prediction (CIIP) mode may be applied to the current CU. Weighted averaging of the inter and intra prediction signals is performed to obtain the CIIP prediction. Affine motion compensated prediction, the affine motion field of the block is described by motion information of two control point (4-parameter) or three control point motion vectors (6-parameter). Subblock-based temporal motion vector prediction (SbTMVP), which is similar to the temporal motion vector prediction (TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. Triangle partition mode, in such a mode, a CU is split evenly into two triangle-shaped partitions, using either the diagonal split or the anti-diagonal split. Besides, the bi-prediction mode is extended beyond simple averaging to allow weighted averaging of the two prediction signals.

Additional to the above prediction modes, skip mode and/or direct mode may be applied.

The prediction processing unit 260 may be further configured to partition the block 203 into smaller block partitions or sub-blocks, e.g. iteratively using quad-tree-partitioning (QT), binary partitioning (BT) or ternary-tree-partitioning (TT) or any combination thereof, and to perform, e.g. the prediction for each of the block partitions or sub-blocks, wherein the mode selection comprises the selection of the tree-structure of the partitioned block 203 and the prediction modes applied to each of the block partitions or sub-blocks.

The inter prediction unit 244 may include motion estimation (ME) unit (not shown in FIG. 2) and motion compensation (MC) unit (not shown in FIG. 2). The motion estimation unit is configured to receive or obtain the picture block 203 (current picture block 203 of the current picture 201) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 2). This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by motion compensation unit (not shown in FIG. 2), may involve fetching or generating the prediction block based on the motion/block vector determined by motion estimation, possibly performing interpolations to sub-pixel precision. Interpolation filtering may generate additional pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists. Motion compensation unit may also generate syntax elements associated with the blocks and the video slice for use by video decoder 30 in decoding the picture blocks of the video slice.

The intra prediction unit 254 is configured to obtain, e.g. receive, the picture block 203 (current picture block) and one or a plurality of previously reconstructed blocks, e.g. reconstructed neighbor blocks, of the same picture for intra estimation. The encoder 20 may, e.g., be configured to select an intra prediction mode from a plurality of (predetermined) intra prediction modes.

Embodiments of the encoder 20 may be configured to select the intra-prediction mode based on an optimization criterion, e.g. minimum residual (e.g. the intra-prediction mode providing the prediction block 255 most similar to the current picture block 203) or minimum rate distortion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

The entropy encoding unit 270 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC), syntax-based context-adaptive binary arithmetic coding (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g. in the form of an encoded bitstream 21. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

FIG. 3 shows an example video decoder 30 that is configured to implement the techniques of this present application. The video decoder 30 configured to receive encoded picture data (e.g. encoded bitstream) 21, e.g. encoded by encoder 100, to obtain a decoded picture 131. During the decoding process, video decoder 30 receives video data, e.g. an encoded video bitstream that represents picture blocks of an encoded video slice and associated syntax elements, from video encoder 100.

In the example of FIG. 3, the decoder 30 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214, the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

The entropy decoding unit 304 is configured to perform entropy decoding to the encoded picture data 21 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

Embodiments of the decoder 30 may comprise a partitioning unit (not depicted in FIG. 3). In one example, the prediction processing unit 360 of video decoder 30 may be configured to perform any combination of the partitioning techniques described above.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

The inverse quantization unit 310 may also be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

Inverse transform processing unit 312 may also be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The loop filter unit 320 may also comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges.

The decoded video blocks 321 in a given frame or picture are then stored in decoded picture buffer 330, which stores reference pictures used for subsequent motion compensation.

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 331, e.g. via output 332, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 18:
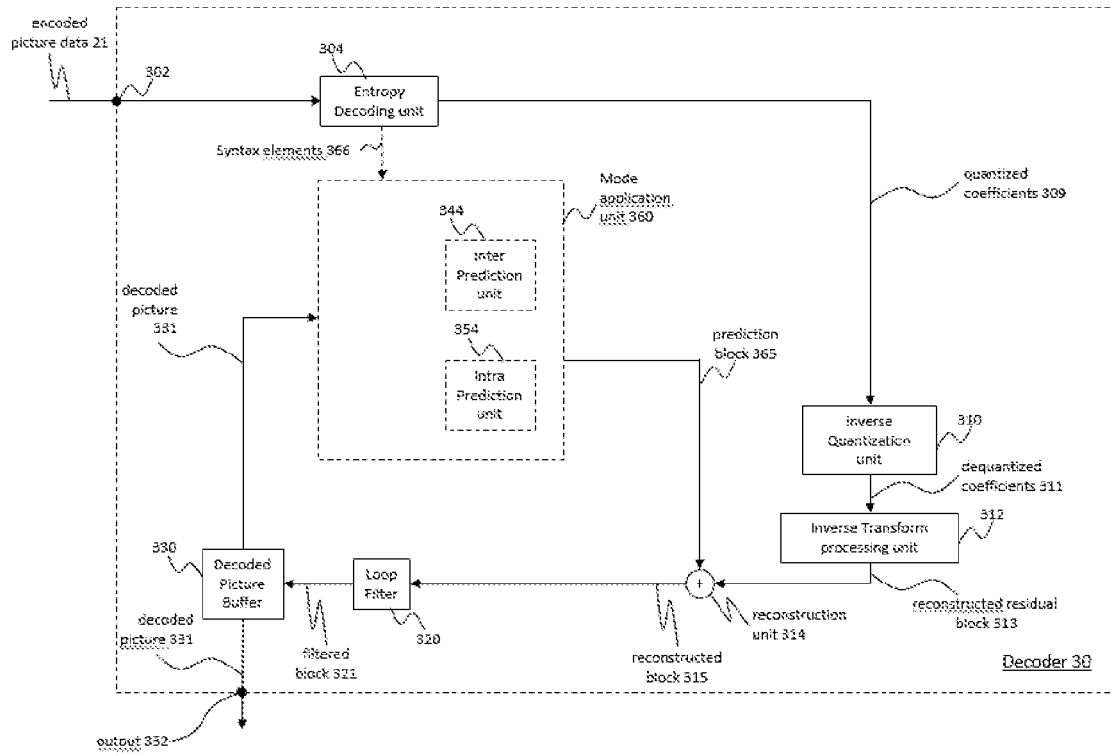
FIG. 18 is a block diagram showing an example structure of a video decoder configured to implement embodiments of the invention.

In addition or alternatively to the above-mentioned embodiments, in another embodiments according to FIG. 18, the inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video decoder 30 as shown in FIG. 3 may be configured to partition and/or decode the picture by using slices/tile groups (also referred to as video tile groups) and/or tiles (also referred to as video tiles), wherein a picture may be partitioned into or decoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

Figure 4:
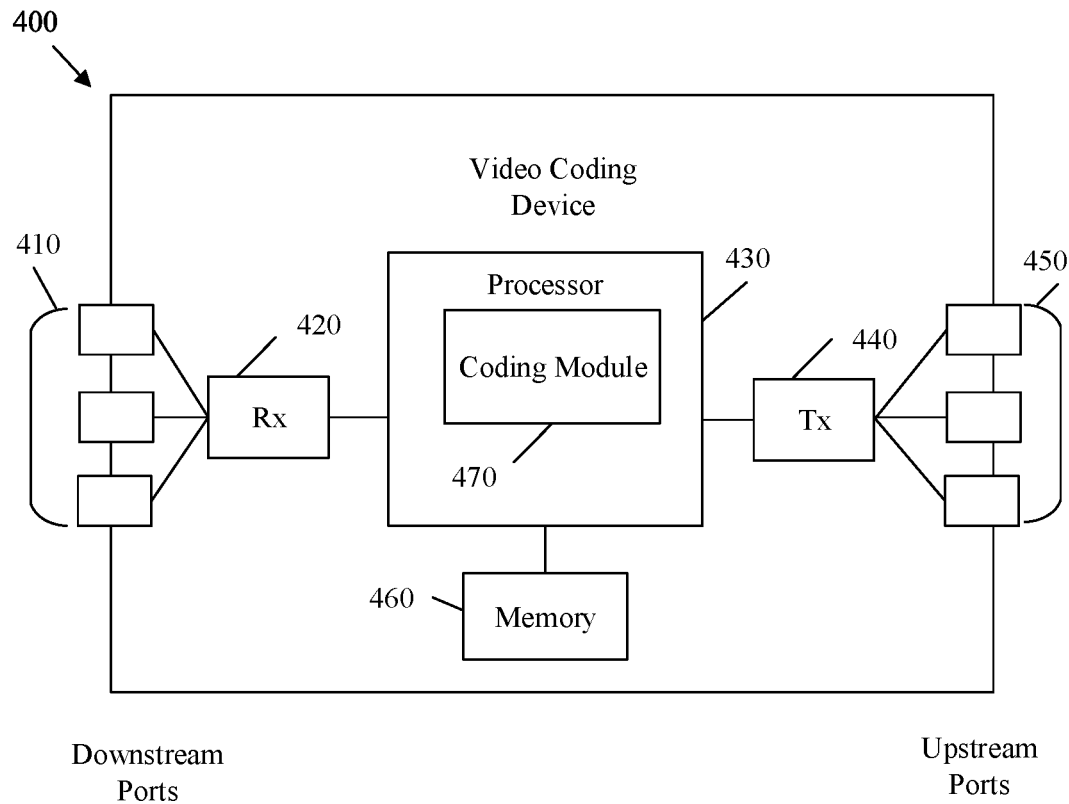
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A. In an embodiment, the video coding device 400 may be one or more components of the video decoder 30 of FIG. 1A or the video encoder 20 of FIG. 1A as described above.

The video coding device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 5:
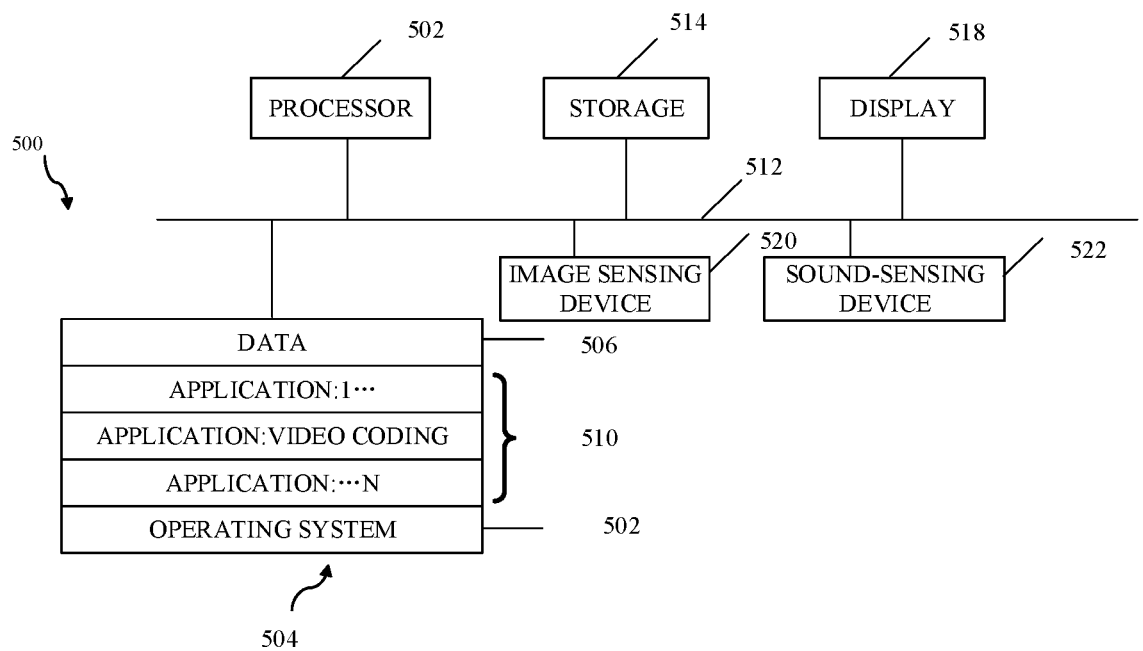
FIG. 5 is a block diagram illustrating another example of an encoding apparatus or a decoding apparatus.

FIG. 5 is a simplified block diagram of an apparatus 500 that may be used as either or both of the source device 310 and the destination device 320 from FIG. 1 according to an exemplary embodiment. The apparatus 500 can implement techniques of this present application described above. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing. The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Next Generation Video Coding (NGVC) removes the separation of the CU, PU and TU concepts, and supports more flexibility for CU partition shapes. The size of the CU corresponds to the size of the coding node and may be square or non-square (e.g., rectangular) in shape.

In addition or alternatively, TU or PU can also be obtained by dividing the CU.

In J. An et al., "Block partitioning structure for next generation video coding", International Telecommunication Union, COM16-C966, September 2015 (hereinafter, "VCEG proposal COM16-C966"), quad-tree-binary-tree (QTBT) partitioning techniques were proposed for future video coding standard beyond HEVC. Simulations have shown that the proposed QTBT structure is more efficient than the quad-tree structure in used HEVC. In HEVC, inter prediction for small blocks is restricted to reduce the memory access of motion compensation, and inter prediction is not supported for 4×4 blocks. In the QTBT of the JEM, these restrictions are removed.

In the QTBT, a CU can have either a square or rectangular shape. As shown in FIG. 6, a coding tree unit (CTU) is first partitioned by a quadtree structure. The quadtree leaf nodes can be further partitioned by a binary tree structure. There are two splitting types, symmetric horizontal splitting and symmetric vertical splitting, in the binary tree splitting. In each case, a node is split by dividing the node down the middle, either horizontally or vertically. The binary tree leaf nodes are called coding units (CUs), and that segmentation is used for prediction and transform processing without any further partitioning. This means that the CU, PU and TU have the same block size in the QTBT coding block structure. A CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.
  CTU size: the root node size of a quadtree, the same concept as in HEVC
  MinQTSize: the minimum allowed quadtree leaf node size
  MaxBTSize: the maximum allowed binary tree root node size
  MaxBTDepth: the maximum allowed binary tree depth
  MinBTSize: the minimum allowed binary tree leaf node size In one example of the QTBT partitioning structure, when the quadtree node has a size equal to or smaller than MinQTSize, no further quadtree is considered. It will not be further split by the binary tree since the size exceeds the MaxBTSize. Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has a width equal to MinBTSize (i.e., 4), no further horizontal splitting is considered. Similarly, when the binary tree node has a height equal to MinBTSize, no further vertical splitting is considered. The leaf nodes of the binary tree are further processed by prediction and transform processing without any further partitioning. In the JEM, the maximum CTU size is 256×256 luma samples. The leaf nodes of the binary-tree (CUs) may be further processed (e.g., by performing a prediction process and a transform process) without any further partitioning.

Figure 7:
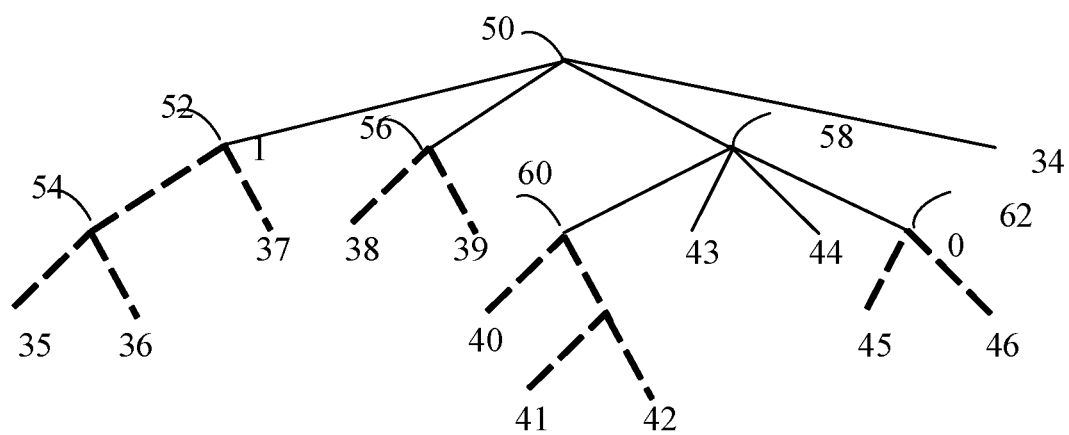
FIG. 7 is an illustrative diagram of an example of tree structure corresponding to the block partitioning using the QTBT structure of FIG. 6.

FIG. 6 illustrates an example of a block 30 (e.g., a CTB) partitioned using QTBT partitioning techniques. As shown in FIG. 6, using QTBT partition techniques, each of the blocks is split symmetrically through the center of each block. FIG. 7 illustrates the tree structure corresponding to the block partitioning of FIG. 6. The solid lines in FIG. 7 indicate quad-tree splitting and dotted lines indicate binary-tree splitting. In one example, in each splitting (i.e., non-leaf) node of the binary-tree, a syntax element (e.g., a flag) is signaled to indicate the type of splitting performed (e.g., horizontal or vertical), where 0 indicates horizontal splitting and 1 indicates vertical splitting. For the quad-tree splitting, there is no need to indicate the splitting type, as quad-tree splitting always splits a block horizontally and vertically into 4 sub-blocks with an equal size.

As shown in FIG. 7, at node 50, block 30 is split into the four blocks 31, 32, 33, and 34, shown in FIG. 6, using QT partitioning. Block 34 is not further split, and is therefore a leaf node. At node 52, block 31 is further split into two blocks using BT partitioning. As shown in FIG. 7, node 52 is marked with a 1, indicating vertical splitting. As such, the splitting at node 52 results in block 37 and the block including both blocks 35 and 36. Blocks 35 and 36 are created by a further vertical splitting at node 54. At node 56, block 32 is further split into two blocks 38 and 39 using BT partitioning.

At node 58, block 33 is split into 4 equal size blocks using QT partitioning. Blocks 43 and 44 are created from this QT partitioning and are not further split. At node 60, the upper left block is first split using vertical binary-tree splitting resulting in block 40 and a right vertical block. The right vertical block is then split using horizontal binary-tree splitting into blocks 41 and 42. The lower right block created from the quad-tree splitting at node 58, is split at node 62 using horizontal binary-tree splitting into blocks 45 and 46. As shown in FIG. 7, node 62 is marked with a 0, indicating horizontal splitting.

In addition to QTBT, a block partitioning structure named multi-type-tree (MTT) is proposed to replace BT in QTBT based CU structures, that means a CTU may be split by QT partitioning firstly to obtain a block of the CTU, and then the block may be split by MTT partitioning secondly.

The MTT partitioning structure is still a recursive tree structure. In MTT, multiple different partition structures (e.g., two or more) are used. For example, according to the MTT techniques, two or more different partition structures may be used for each respective non-leaf node of a tree structure, at each depth of the tree structure. The depth of a node in a tree structure may refer to the length of the path (e.g., the number of splits) from the node to the root of the tree structure.

In MTT, there are two partition types, BT partitioning and ternary-tree (TT) partitioning. Partition type can be selected from BT partitioning and TT partitioning. The TT partition structure differs from that of the QT or BT structures, in that the TT partition structure does not split a block down the center. The center region of the block remains together in the same sub-block. Different from QT, which produces four blocks, or binary tree, which produces two blocks, splitting according to a TT partition structure produces three blocks. Example partition types according to the TT partition structure include symmetric partition types (both horizontal and vertical), as well as asymmetric partition types (both horizontal and vertical). Furthermore, the symmetric partition types according to the TT partition structure may be uneven/non-uniform or even/uniform. The asymmetric partition types according to the TT partition structure are uneven/non-uniform. In one example, a TT partition structure may include at least one of the following partition types: horizontal even/uniform symmetric ternary-tree, vertical even/uniform symmetric ternary-tree, horizontal uneven/non-uniform symmetric ternary-tree, vertical uneven/non-uniform symmetric ternary-tree, horizontal uneven/non-uniform asymmetric ternary-tree, or vertical uneven/non-uniform asymmetric ternary-tree partition types.

In general, an uneven/non-uniform symmetric ternary-tree partition type is a partition type that is symmetric about a center line of the block, but where at least one of the resultant three blocks is not the same size as the other two.

One preferred example is where the side blocks are ¼ the size of the block, and the center block is ½ the size of the block. An even/uniform symmetric ternary-tree partition type is a partition type that is symmetric about a center line of the block, and the resultant blocks are all the same size. Such a partition is possible if the block height or width, depending on a vertical or horizontal split, is a multiple of 3. An uneven/non-uniform asymmetric ternary-tree partition type is a partition type that is not symmetric about a center line of the block, and where at least one of the resultant blocks is not the same size as the other two.

Figure 8:
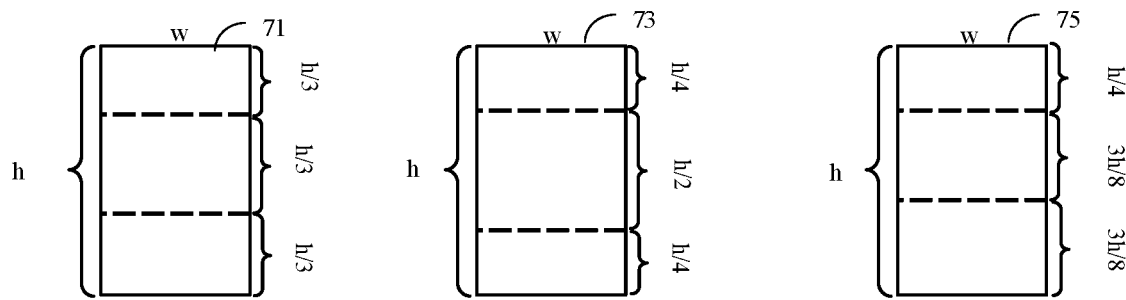
FIG. 8 is an illustrative diagram of an example of horizontal ternary-tree partition types.
Figure 9:
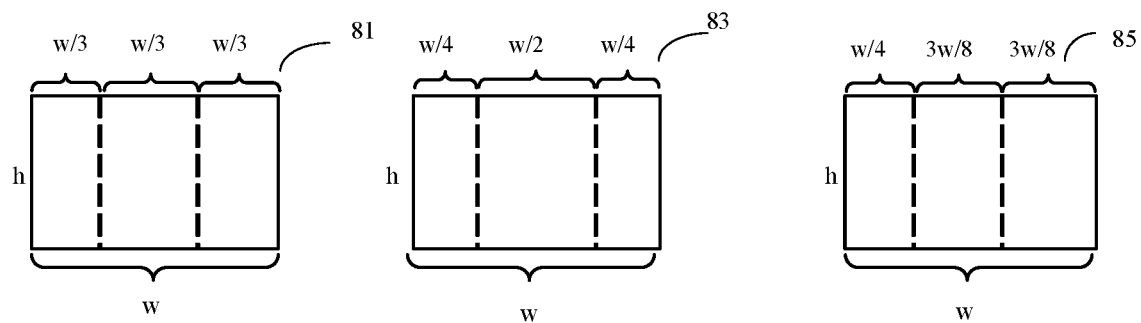
FIG. 9 is an illustrative diagram of an example of vertical ternary-tree partition types.

FIG. 8 is a conceptual diagram illustrating optional example horizontal ternary-tree partition types. FIG. 9 is a conceptual diagram illustrating optional example vertical ternary-tree partition types. In both FIG. 8 and FIG. 9, h represents the height of the block in luma or chroma samples and w represents the width of the block in luma or chroma samples. Note that the respective center line of a block do not represent the boundary of the block (i.e., the ternary-tree partitions do not split a block through the center line). Rather, the center line are used to depict whether or not a particular partition type is symmetric or asymmetric relative to the center line of the original block. The center line is also along the direction of the split.

As shown in FIG. 8, block 71 is partitioned with a horizontal even/uniform symmetric partition type. The horizontal even/uniform symmetric partition type produces symmetrical top and bottom halves relative to the center line of block 71. The horizontal even/uniform symmetric partition type produces three sub-blocks of equal size, each with a height of h/3 and a width of w. The horizontal even/uniform symmetric partition type is possible when the height of block 71 is evenly divisible by 3.

Block 73 is partitioned with a horizontal uneven/non-uniform symmetric partition type. The horizontal uneven/non-uniform symmetric partition type produces symmetrical top and bottom halves relative to the center line of block 73. The horizontal uneven/non-uniform symmetric partition type produces two blocks of equal size (e.g., the top and bottom blocks with a height of h/4), and a center block of a different size (e.g., a center block with a height of h/2). In one example, according to the horizontal uneven/non-uniform symmetric partition type, the area of the center block is equal to the combined areas of the top and bottom blocks. In some examples, the horizontal uneven/non-uniform symmetric partition type may be preferred for blocks having a height that is a power of 2 (e.g., 2, 4, 8, 16, 32, etc.).

Block 75 is partitioned with a horizontal uneven/non-uniform asymmetric partition type. The horizontal uneven/non-uniform asymmetric partition type does not produce a symmetrical top and bottom half relative to the center line of block 75 (i.e., the top and bottom halves are asymmetric). In the example of FIG. 8, the horizontal uneven/non-uniform asymmetric partition type produces a top block with a height of h/4, a center block with a height of 3h/8, and a bottom block with a height of 3h/8. Of course, other asymmetric arrangements may be used.

As shown in FIG. 9, block 81 is partitioned with a vertical even/uniform symmetric partition type. The vertical even/uniform symmetric partition type produces symmetrical left and right halves relative to the center line of block 81. The vertical even/uniform symmetric partition type produces three sub-blocks of equal size, each with a width of w/3 and a height of h. The vertical even/uniform symmetric partition type is possible when the width of block 81 is evenly divisible by 3.

Block 83 is partitioned with a vertical uneven/non-uniform symmetric partition type. The vertical uneven/non-uniform symmetric partition type produces symmetrical left and right halves relative to the center line of block 83. The vertical uneven/non-uniform symmetric partition type produces symmetrical left and right halves relative to the center line of 83. The vertical uneven/non-uniform symmetric partition type produces two blocks of equal size (e.g., the left and right blocks with a width of w/4), and a center block of a different size (e.g., a center block with a width of w/2). In one example, according to the vertical uneven/non-uniform symmetric partition type, the area of the center block is equal to the combined areas of the left and right blocks. In some examples, the vertical uneven/non-uniform symmetric partition type may be preferred for blocks having a width that is a power of 2 (e.g., 2, 4, 8, 16, 32, etc.).

Block 85 is partitioned with a vertical uneven/non-uniform asymmetric partition type. The vertical uneven/non-uniform asymmetric partition type does not produce a symmetrical left and right half relative to the center line of block 85 (i.e., the left and right halves are asymmetric). In the example of FIG. 9, the vertical uneven/non-uniform asymmetric partition type produces a left block with a width of w/4, a center block with a width of 3w/8, and a right block with a width of 3w/8. Of course, other asymmetric arrangements may be used.

In addition to the parameters for QTBT, the following parameters are defined for the MTT partitioning scheme.

MaxBTSize: the maximum allowed binary tree root node size

MinBtSize: the minimum allowed binary tree root node size

MaxMttDepth: the maximum multi-type tree depth

MaxMttDepth offset: the maximum multi-type tree depth offset

MaxTtSize: the maximum allowed ternary tree root node size

MinTtSize: the minimum allowed ternary tree root node size

MinCbSize: the minimum allowed coding block size

The embodiments of the disclosure may be implemented by a video encoder or a video decoder, such as video encoder 20 of FIG. 2 or video decoder 30 of FIG. 3, in accordance with an embodiment of the present application. One or more structural elements of video encoder 20 or video decoder 30, including partition unit, may be configured to perform the techniques of embodiments of the disclosure.

In [JVET-K1001-v4], JVET AHG report, J.-R. Ohm, G. J. Sulivan, http://phenix.int-evry.fr/jvet/, the syntax element of MinQtSizeY (log2_min_qt_size_intra_slices_minus2 and log2_min_qt_size_inter_slices_minus2) and the syntax element of MaxMttDepth (max_mtt_hierarchy_depth_inter_slices and max_mtt_hierarchy_depth_intra_slices) are singled in SPS.

The syntax element of the difference between the luma CTB size and MaxBtSizeY (log2_diff_ctu_max_bt_size) is signaled in the slice header.

CtbSizeY and the corresponding syntax element log2_ctu_size_minus2 indicate the size of the maximum coding block size in terms of the number of luma samples.

MinQtSizeY is defined as the minimum luma size of a leaf block resulting from quadtree splitting of a CTU (coding tree unit). The size can indicate either the width or height of the block in the number of samples. It might also indicate the width and the height together in the case of square blocks. As an example if the MinQtSizeY is equal to 16, a coding block that has a size smaller than or equal to 16 cannot be partitioned into child block using the quadtree splitting method. In the prior art MinQtSizeY, log2_min_qt_size_intra_slices_minus2 and log2_min_qt_size_inter_slices_minus2 are used to indicate the minimum quadtree block size. Please note that the indication of the size can be an indirect indication, meaning that log2_min_qt_size_intra_slices_minus2 might be the binary logarithm (base 2) of the number of luma samples of the minimum quadtree block.MaxMttDepth is defined as the maximum hierarchy depth for coding units resulting from multi-type tree splitting of a quadtree leaf or CTU. A coding tree unit (or CTB, Coding Tree Block) describes the maximum block size that is used to partition a picture frame. MaxMttDepth describes the upper limit for the number of consecutive binary or ternary splitting that can be applied to obtain a child block. As an example, assume the CTU size is 128×128 (width equal to 128 and height equal to 128), and MaxMttDepth is equal to 1. In this case the parent block (128×128 in size) can first be split into two 128×64 child blocks using binary splitting. However the child blocks cannot apply any consecutive binary splitting (to result in either 128×32 or 64×64 child blocks) since the maximum number of allowed binary splitting is reached. It is noted that MaxMttDepth can control the maximum binary splitting depth or maximum ternary splitting depth, or both at the same time. If it controls both binary and ternary splitting at the same time, 1 binary split followed by 1 ternary split can be counted as 2 hierarchical splits. In the prior art MaxMttDepth, max_mtt_hierarchy_depth_inter_slices and max_mtt_hierarchy_depth_intra_slices are used to indicate the maximum hierarchy depth for coding units resulting from multi-type tree It is noted that the names of the syntax elements are used as they appear in the prior art. However it should be clear that the names can be changed, therefore what should be considered important is the logical meaning of the syntax elements.

MaxBtSizeY is defined as the maximum luma size (width or height), in terms of the number of samples, of a coding block that can be split using a binary split. As an example if MaxBtSizeY is equal to 64, a coding block that is bigger in size either in width or height cannot be split using binary splitting. This means that a block that has a size 128×128 cannot be split using binary splitting, whereas a block that has a size 64×64 can be split using binary splitting.

MinBtSizeY is defined as the minimum luma size (width or height), in terms of number of samples, of a coding block that can be split using a binary split. As an example if MinBtSizeY is equal to 16, a coding block that is smaller or equal in size either in width or height cannot be split using binary splitting. This means that a block that has a size 8×8 cannot be split using binary splitting, whereas a block that has a size 32×32 can be split using binary splitting.

MinCbSizeY is defined as the minimum coding block size. As an example MinCbSizeY can be equal to 8, which means that a parent block that has a size 8×8 cannot be split using any of the splitting methods since the resulting child block is guaranteed to be smaller than the MinCbSizeY in either width or height. According to a second example, if MinCbSizeY is equal to 8 a parent block that has a size 8×16 cannot be partitioned using e.g. quadtree splitting, since the resulting four child blocks would have a size of 4×8 (width equal to 4 and height equal to 8), and the width of the resulting child blocks would be smaller than MinCbSizeY. In the second example, it was assumed that MinCbSizeY applies to both width and height of the block, although 2 different syntax elements can be used to independently limit the width and height.

MinTbSizeY is defined as the minimum transform block size, in terms of number of samples, of a coding block that can be split using a ternary split. As an example if MinTbSizeY is equal to 16, a coding block that is smaller or equal in size either in width or height cannot be split using ternary splitting. This means that a block that has a size 8×8 cannot be split using ternary splitting, whereas a block that has a size 32×32 can be split using ternary splitting.

Sequence Parameter Set RBSP (Raw Byte Sequence Payload) Syntax (Section 7.3.2.1 of [JVET-K1001-v4])

[Ed. (BB): Preliminary basic SPS, subject to further study and pending further specification development.]

|  | Descriptor |
|---|---|
| seq_parameter_set_rbsp( ) { |  |
|     sps_seq_parameter_set_id | ue(v) |
|     chroma_format_idc | ue(v) |
|     if( chroma_format_idc = = 3 ) |  |
|         separate_colour_plane_flag | u(1) |
|     pic_width_in_luma_samples | ue(v) |
|     pic_height_in_luma_samples | ue(v) |
|     bit_depth_luma_minus8 | ue(v) |
|     bit_depth_chroma_minus8 | ue(v) |
|     qtbtt_dual_tree_intra_flag | ue(v) |
|     log2_ctu_size_minus2 | ue(v) |
|     log2_min_qt_size_intra_slices_minus2 | ue(v) |
|     log2_min_qt_size_inter_slices_minus2 | ue(v) |
|     max_mtt_hierarchy_depth_inter_slices | ue(v) |
|     max_mtt_hierarchy_depth_intra_slices | ue(v) |
|     sps_cclm_enabled_flag | ue(1) |
|     sps_mts_intra_enabled_flag | ue(1) |
|     sps_mts_inter_enabled_flag | ue(1) |
|     rbsp_trailing_bits( ) |  |
| } |  |

In these syntax tables, bold are the syntax elements included in the bitstream. The elements which are not shown in bold are conditions or placeholders for further syntax units.

Slice header syntax (Section 7.3.3 of [JVET-K1001-v4])
[Ed. (BB): Preliminary basic slice header, subject to further study and pending further specification development.]

|  | Descriptor |
|---|---|
| slice_header( ) { |  |
|     slice_pic_parameter_set_id | ue(v) |
|     slice_address | u(v) |
|     slice_type | ue(v) |
|     if ( slice_type != I ) |  |
|         log2_diff_ctu_max_bt_size | ue(v) |
|     dep_quant_enabled_flag | u(1) |
|     if( !dep_quant_enabled_flag ) |  |
|         sign_data_hiding_enabled_flag | u(1) |
|     byte_alignment( ) |  |
| } |  |

The semantics of the syntax elements, i.e. how the syntax elements included in the bitstream are to be interpreted, are also provided in a standard. In the following, the semantics for the above mentioned elements is provided.

Sequence parameter set RBSP semantics (Section 7.4.3.1 of [JVET-K1001-v4]) log2_ctu_size_minus2 plus 2 specifies the luma coding tree block size of each CTU.

The variables CtbLog2SizeY, CtbSizeY, MinCbLog2SizeY, MinCbSizeY, MinTbLog2SizeY, MaxTbLog2SizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$CtbLog2SizeY = log2\_ctu\_size\_minus2 + 2 \quad (7\text{-}5)$$

$$CtbSizeY = 1 << CtbLog2SizeY \quad (7\text{-}6)$$

$$MinCbLog2SizeY = 2 \quad (7\text{-}7)$$

$$MinCbSizeY = 1 << MinCbLog2SizeY \quad (7\text{-}8)$$

$$MinTbSizeY = 4 \quad (7\text{-}9)$$

$$MaxTbSizeY = 64 \quad (7\text{-}10)$$

$$PicWidthInCtbsY = Ceil(pic\_width\_in\_luma\_samples \div CtbSizeY) \quad (7\text{-}11)$$

$$PicHeightInCtbsY = Ceil(pic\_height\_in\_luma\_samples \div CtbSizeY) \quad (7\text{-}12)$$

$$PicSizeInCtbsY = PicWidthInCtbsY * PicHeightInCtbsY \quad (7\text{-}13)$$

$$PicWidthInMinCbsY = pic\_width\_in\_luma\_samples / MinCbSizeY \quad (7\text{-}14)$$

$$PicHeightInMinCbsY = pic\_height\_in\_luma\_samples / MinCbSizeY \quad (7\text{-}15)$$

$$PicSizeInMinCbsY = PicWidthInMinCbsY * PicHeightInMinCbsY \quad (7\text{-}16)$$

$$PicSizeInSamplesY = pic\_width\_in\_luma\_samples * pic\_height\_in\_luma\_samples \quad (7\text{-}17)$$

$$PicWidthInSamplesC = pic\_width\_in\_luma\_samples / SubWidthC \quad (7\text{-}18)$$

$$PicHeightInSamplesC = pic\_height\_in\_luma\_samples / SubHeightC \quad (7\text{-}19)$$

. . .

log2_min_qt_size_intra_slices_minus2 plus 2 specifies the minimum luma size of a leaf block resulting from quadtree splitting of a CTU in slices with slice_type equal to 2 (I). The value of log2_min_qt_size_intra_slices_minus2 shall be in the range of 0 to CtbLog2SizeY−2, inclusive.

$$MinQtLog2SizeIntraY = log2\_min\_qt\_size\_intra\_slices\_minus2 + 2 \quad (7\text{-}22)$$

[Ed. (BB): The leaf of a quadtree can either be a coding unit or the root of a nested multi-type tree.]

log2_min_qt_size_inter_slices_minus2 plus 2 specifies the minimum luma size of a leaf block resulting from quadtree splitting of a CTU in slices with slice_type equal to 0 (B) or 1 (P). The value of log2_min_qt_size_inter_slices_minus2 shall be in the range of 0 to CtbLog2SizeY−2, inclusive.

$$MinQtLog2SizeInterY = log2\_min\_qt\_size\_inter\_slices\_minus2 + 2 \quad (7\text{-}23)$$

max_mtt_hierarchy_depth_inter_slices specifies the maximum hierarchy depth for coding units resulting from multi-type tree splitting of a quadtree leaf in slices with slice type equal to 0 (B) or 1 (P). The value of max_mtt_hierarchy_depth_inter_slices shall be in the range of 0 to CtbLog2SizeY−MinTbLog2SizeY, inclusive.

max_mtt_hierarchy_depth_intra_slices specifies the maximum hierarchy depth for coding units resulting from multi-type tree splitting of a quadtree leaf in slices with slice type equal to 2 (I). The value of max_mtt_hierarchy_depth_intra_slices shall be in the range of 0 to CtbLog2SizeY−MinTbLog2SizeY, inclusive.

. . .

Slice header semantics (Section 7.4.4 of [JVET-K1001-v4]))

. . .

log2_diff_ctu_max_bt_size specifies the difference between the luma CTB size and the maximum luma size (width or height) of a coding block that can be split using a binary split. The value of log2_diff_ctu_max_bt_size shall be in the range of 0 to CtbLog2SizeY−MinCbLog2SizeY, inclusive. When log2_diff_ctu_max_bt_size is not present, the value of log2_diff_ctu_max_bt_size is inferred to be equal to 2. The variables MinQtLog2SizeY, MaxBtLog2SizeY, MinBtLog2SizeY, MaxTtLog2SizeY, MinTtLog2SizeY, MaxBtSizeY, MinBtSizeY, MaxTtSizeY, MinTtSizeY and MaxMttDepth are derived as follows:

$$MinQtLog2SizeY = (slice\ type == I)\ ? MinQtLog2SizeIntraY : MinQtLog2SizeInterY \quad (7\text{-}25)$$

$$MaxBtLog2SizeY = CtbLog2SizeY - log2\_diff\_ctu\_max\_bt\_size \quad (7\text{-}26)$$

$$MinBtLog2SizeY = MinCbLog2SizeY \quad (7\text{-}27)$$

$$MaxTtLog2SizeY = (slice\ type == I)?5:6 \quad (7\text{-}28)$$

$$MinTtLog2SizeY = MinCbLog2SizeY \quad (7\text{-}29)$$

$$MinQtSizeY = 1 << MinQtLog2SizeY \quad (7\text{-}30)$$

$$MaxBtSizeY = 1 << MaxBtLog2SizeY \quad (7\text{-}31)$$

$$MinBtSizeY = 1 << MinBtLog2SizeY \quad (7\text{-}32)$$

$$MaxTtSizeY = 1 << MaxTtLog2SizeY \quad (7\text{-}33)$$

$$MinTtSizeY = 1 << MinTtLog2SizeY \quad (7\text{-}34)$$

$$MaxMttDepth = (slice\ type == I)?max\_mtt\_hierarchy\_depth\_intra\_slices : max\_mtt\_hierarchy\_depth\_inter\_slices \quad (7\text{-}35)$$

[Ed. (BB): Currently the maximum TT size is fixed (32×32 luma samples and corresponding chroma samples for I-slices and 64×64 luma samples and corresponding chroma samples for P/B-slices) as well as the maximum BT size for I-slices (CtbLog2SizeY−2, e.g. 32×32 luma samples and corresponding chroma samples for a CTU size of 128×128 luma samples).]

In embodiment 1 of the disclosure:

Embodiment 1 relates to signaling, in the SPS (sequence parameter sets), the partition constraint related high level syntax elements (e.g. MinQtSizeY, MaxMttDepht, MaxBtSizeY) individually by slice type, and/or signaling a partition constraint override enabled (or disabled) flag.

In the Slice header, signaling the partition constraint override flag means:
If the flag is true,
overriding partition constraint related high level syntax elements in the slice header, here the overriding means re-signaling the elements in the slice header.
Otherwise,
inferring the partition constraint related high level syntax elements with the values signaled from SPS based on slice type.

In other words, partition constraint override flag is signaled in the slice header in order to indicate whether one or more partition constraint parameters are signaled in the slice header or in a parameter set such as SPS. It is noted that the parameter set does not necessarily have to be SPS. It can be PPS, or any other kind of parameter set which relates, e.g. to more than one slice, e.g. to one or more pictures of the video.

Alternatively,

In the SPS, the partition constraint related high level syntax elements (e.g MinQtSizeY, MaxMttDepht, MaxBtSizeY) are signaled individually in couples based on a feature or index, and a partition constraint override enabled (or disabled) flag is signaled.

In the Slice header, the partition constraint override flag is signaled and:

if the flag is true, overriding partition constraint related high level syntax elements in the slice header, here the overriding means re-signaling the elements in the slice header.

otherwise inferring the partition constraint related high level syntax elements with the values signaled from SPS based on the feature or index used to individual the signaling.

Regarding the position of signaling and overriding, alternatively, for instance:

the signaling of partition constraint related high level syntax elements can be performed in a parameter set, and overriding operation can be performed in a slice header.

the signaling of partition constraint related high level syntax elements can be performed in a parameter set, and overriding operation can be performed in a tile header.

the signaling of partition constraint related high level syntax elements can be performed in a first parameter set, and overriding operation can be performed in a second parameter set.

the signaling of partition constraint related high level syntax elements can be performed in the slice header, and overriding operation can be performed in the tile header.

In general, when the signaling of partition constraint related high level syntax elements is performed in a first parameter set, and overriding operation is performed in a second parameter set, efficient coding may be achieved in that the first set relates to larger image/video areas than the second parameter set.

Technique advantage (for example signaling in SPS, overriding in slice header): The high level partition constraint controls the tradeoff between partition complexity and the coding efficiency from the partition. Embodiments of the invention make sure the flexibility to control the tradeoff for an individual slice.

Both encoder and decoding do the same (corresponding) operations.

The corresponding syntax and semantics modification based on prior art are shown below:

Modified Sequence Parameter Set RBSP Syntax (Section 7.3.2.1 of [JVET-K1001-v4])

[Ed. (BB): Preliminary basic SPS, subject to further study and pending further specification development.]

| | Descriptor |
|---|---|
| seq_parameter_set_rbsp( ) { | |
|     sps_seq_parameter_set_id | ue(v) |
|     chroma_format_idc | ue(v) |
|     if( chroma_format_idc = = 3 ) | |
|         separate_colour_plane_flag | u(1) |
|     pic_width_in_luma_samples | ue(v) |
|     pic_height_in_luma_samples | ue(v) |
|     bit_depth_luma_minus8 | ue(v) |
|     bit_depth_chroma_minus8 | ue(v) |
|     qtbtt_dual_tree_intra_flag | ue(v) |
|     log2_ctu_size_minus2 | ue(v) |
|     partition_constraint_override_enabled_flag | ue(v) |
|     sps_log2_min_qt_size_intra_slices_minus2 | ue(v) |

-continued

| | Descriptor |
|---|---|
|     sps_log2_min_qt_size_inter_slices_minus2 | ue(v) |
|     sps_max_mtt_hierarchy_depth_inter_slices | ue(v) |
|     sps_max_mtt_hierarchy_depth_intra_slices | ue(v) |
|     sps_log2_diff_ctu_max_bt_size_intra_slices | ue(v) |
|     sps_log2_diff_ctu_max_bt_size_inter_slices | ue(v) |
|     sps_cclm_enabled_flag | ue(1) |
|     sps_mts_intra_enabled_flag | ue(1) |
|     sps_mts_inter_enabled_flag | ue(1) |
|     rbsp_trailing_bits( ) | |
| } | |

Modified Slice Header Syntax (Section 7.3.3 of [JVET-K1001-v4])

[Ed. (BB): Preliminary basic slice header, subject to further study and pending further specification development.]

| | Descriptor |
|---|---|
| slice_header( ) { | |
|     slice_pic_parameter_set_id | ue(v) |
|     slice_address | u(v) |
|     slice_type | ue(v) |
|     if (partition_constraint_override_enabled_flag) { | |
|         partition_constraint_override_flag | ue(v) |
|         if (partition_constraint_override_flag) { | |
|             log2_min_qt_size_minus2 | ue(v) |
|             max_mtt_hierarchy_depth | ue(v) |
|             log2_diff_ctu_max_bt_size | ue(v) |
|         } | |
|     } | |
|     ~~if( slice_type != I )~~ | |
|         ~~log2_diff_ctu_max_bt_size~~ | ~~ue(v)~~ |
|     dep_quant_enabled_flag | u(11) |
|     if( !dep_quant_enabled_flag ) | |
|         sign_data_hiding_enabled_flag | u(1) |
|     byte_alignment( ) | |
| } | |
| ... | |

Modified Sequence parameter set RBSP semantics (Section 7.4.3.1 of [JVET-K1001-v4])

. . .

partition_constraint_override_enabled_flag equal to 1 specifies the presence of partition_constraint_override_flag in the slice headers for slices referring to the SPS. partition_constraint_override_enabled_flag equal to 0 specifies the absence of partition_constraint_override_flag in the slice headers for slices referring to the SPS.

sps_log2_min_qt_size_intra_slices_minus2 plus 2 specifies the default minimum luma size of a leaf block resulting from quadtree splitting of a CTU in slices with slice type equal to 2 (I) referring to the SPS, unless the default minimum luma sizes of a leaf block resulting from quadtree splitting of a CTU are overridden by the minimum luma sizes of a leaf block resulting from quadtree splitting of a CTU present in the slice header of the slices referring to the SPS. The value of log2_min_qt_size_intra_slices_minus2 shall be in the range of 0 to CtbLog2SizeY−2, inclusive.

sps_log2_min_qt_size_inter_slices_minus2 plus 2 specifies the default minimum luma size of a leaf block resulting from quadtree splitting of a CTU in slices with slice type equal to 0 (B) or 1(P) referring to the SPS, unless the default minimum luma sizes of a leaf block resulting from quadtree splitting of a CTU are overridden by the minimum luma sizes of a leaf block resulting from quadtree splitting of a CTU present in the slice header of the slices referring to the SPS. The value of log2_min_qt_size_inter_slices_minus2 shall be in the range of 0 to CtbLog2SizeY−2, inclusive.

sps_max_mtt_hierarchy_depth_inter_slices specifies the default maximum hierarchy depth for coding units resulting from multi-type tree splitting of a quadtree leaf in slices with slice type equal to 0 (B) or 1 (P) referring to the SPS, unless the default maximum hierarchy depths for coding units resulting from multi-type tree splitting of a quadtree leaf are overridden by the maximum hierarchy depths for coding units resulting from multi-type tree splitting of a quadtree leaf present in the slice header of the slices referring to the SPS. The value of max_mtt_hierarchy_depth_inter_slices shall be in the range of 0 to CtbLog2SizeY−MinTbLog2SizeY, inclusive.

sps_max_mtt_hierarchy_depth_intra_slices specifies the default maximum hierarchy depth for coding units resulting from multi-type tree splitting of a quadtree leaf in slices with slice type equal to 2 (I) referring to the SPS, unless the default maximum hierarchy depths for coding units resulting from multi-type tree splitting of a quadtree leaf are overridden by the maximum hierarchy depths for coding units resulting from multi-type tree splitting of a quadtree leaf present in the slice header of the slices referring to the SPS. The value of max_mtt_hierarchy_depth_intra_slices shall be in the range of 0 to CtbLog2SizeY−MinTbLog2SizeY, inclusive.

sps_log2_diff_ctu_max_bt_size_intra_slices specifies the default difference between the luma CTB size and the maximum luma size (width or height) of a coding block that can be split using a binary split in slices with slice type equal to 2 (I) referring to the SPS, unless the default differences between the luma CTB size and the maximum luma size (width or height) of a coding block that can be split using a binary split are overridden by the differences between the luma CTB size and the maximum luma size (width or height) of a coding block that can be split using a binary split present in the slice header of the slices referring to the SPS. The value of log2_diff_ctu_max_bt_size shall be in the range of 0 to CtbLog2SizeY−MinCbLog2SizeY, inclusive.

sps_log2_diff_ctu_max_bt_size_inter_slices specifies the default difference between the luma CTB size and the maximum luma size (width or height) of a coding block that can be split using a binary split in slices with slice_type equal to 0 (B) or 1 (P) referring to the SPS, unless the default differences between the luma CTB size and the maximum luma size (width or height) of a coding block that can be split using a binary split are overridden by the differences between the luma CTB size and the maximum luma size (width or height) of a coding block that can be split using a binary split present in the slice header of the slices referring to the SPS. The value of log2_diff_ctu_max_bt_size shall be in the range of 0 to CtbLog2SizeY−MinCbLog2SizeY, inclusive.

. . .

Modified Slice header semantics (Section 7.4.4 of [JVET-K1001-v4])

. . .

partition_constraint_override_flag equal to 1 specifies that partition constraint parameters are present in the slice header. partition_constraint_override_flag equal to 0 specifies that partition constraint parameters are not present in the slice header. When not present, the value of partition constraints override flag is inferred to be equal to 0.

log2_min_qt_size_minus2 plus 2 specifies the minimum luma size of a leaf block resulting from quadtree splitting of a CTU fur the current slice. The value of log2_min_qt_size_inter_slices_minus2 shall be in the range of 0 to CtbLog2SizeY−2, inclusive. When not present, the values of log2_min_qt_size_minus2 is inferred to be equal to sps_log2_min_qt_size_intra_slices_minus2 if slice_type equal to 2 (I) and inferred to be equal to sps_log2_min_qt_size_inter_slices_minus2 if slice_type equal to 0 (B) or 1 (P).

max_mtt_hierarchy_depth specifies the maximum hierarchy depth for coding units resulting from multi-type tree splitting of a quadtree leaf for the current slice. The value of max_mtt_hierarchy_depth_intra_slices shall be in the range of 0 to CtbLog2SizeY−MinTbLog2SizeY, inclusive. When not present, the values of max_mtt_hierarchy_depth is inferred to be equal to sps_max_mtt_hierarchy_depth_intra_slices with slice_type equal to 2 (I) and inferred to be equal to sps_max_mtt_hierarchy_depth_inter_slices with slice_type equal to 0 (B) or 1 (P).

log2_diff_ctu_max_bt_size specifies the difference between the luma CTB size and the maximum luma size (width or height) of a coding block that can be split using a binary split for the current slice. The value of log2_diff_ctu_max_bt_size shall be in the range of 0 to CtbLog2SizeY−MinCbLog2SizeY, inclusive. When not present, the values of log2_diff_ctu_max_bt_size is inferred to be equal to sps_log2_diff_ctu_max_bt_size_intra_slices with slice_type equal to 2 (I) and inferred to be equal to sps_log2_diff_ctu_max_bt_size_inter_slices with slice_type equal to 0 (B) or 1 (P).

The variables MinQtLog2SizeY, MaxBtLog2SizeY, MinBtLog2SizeY, MaxTtLog2SizeY, MinTtLog2SizeY, MaxBtSizeY, MinBtSizeY, MaxTtSizeY, MinTtSizeY and MaxMttDepth are derived as follows:

$$\text{MinQtLog2SizeY} = \text{log2\_min\_qt\_size\_minus2} + 2 \quad (7\text{-}25)$$

$$\text{MaxBtLog2SizeY} = \text{CtbLog2SizeY} - \text{log2\_diff\_ctu\_max\_bt\_size} \quad (7\text{-}26)$$

$$\text{MinBtLog2SizeY} = \text{MinCbLog2SizeY} \quad (7\text{-}27)$$

$$\text{MaxTtLog2SizeY} = (\text{slice type} == I)?5:6 \quad (7\text{-}28)$$

$$\text{MinTtLog2SizeY} = \text{MinCbLog2SizeY} \quad (7\text{-}29)$$

$$\text{MinQtSizeY} = 1 << \text{MinQtLog2SizeY} \quad (7\text{-}30)$$

$$\text{MaxBtSizeY} = 1 << \text{MaxBtLog2SizeY} \quad (7\text{-}31)$$

$$\text{MinBtSizeY} = 1 << \text{MinBtLog2SizeY} \quad (7\text{-}32)$$

$$\text{MaxTtSizeY} = 1 << \text{MaxTtLog2SizeY} \quad (7\text{-}33)$$

$$\text{MinTtSizeY} = 1 << \text{MinTtLog2SizeY} \quad (7\text{-}34)$$

$$\text{MaxMttDepth} = 1 << \text{max\_mtt\_hierarchy\_depth} \quad (7\text{-}35)$$

In an alternative implementation of the embodiment 1 of the disclosure is described in the following:

The Sequence parameter set (SPS) contains parameters that apply to an entire coded video sequence, and do not change from picture to picture within a coded video sequence (short for CVS). All pictures in the same CVS use the same SPS.

The PPS contains parameters that may change for different pictures within the same coded video sequence. However, multiple pictures may refer to the same PPS, even those with different slice coding types (I, P, and B).

As mentioned in the embodiment 1 of the present disclosure, the high level partition constraint controls the tradeoff between partition complexity and the coding efficiency from partition. To address the advantage of flexible control between the complexity and coding efficiency in individual picture/slice, instead of the method in the embodiment 1 (signal the partition constraint syntax elements in SPS and override the partition constraint syntax element in the slice header based on the partition constraint override flag, which is signaled the slice header.), the partition constraint syntax elements (MinQtSizeY, MaxMttDepth, MaxBtSizeY, MaxTtSizeY, etc.) are signaled in PPS, in order to adjust the tradeoff of partition complexity and the coding efficiency from partition in picture level. If each picture uses individual PPS, then the adjustment is applied for individual picture, if multiple pictures refer to the same PPS, then the same adjustment is applied for the pictures.

The PPS level signaling of partition constraint syntax elements can be signaled in one group, for example, in the PPS one indicator for MinQtSizeY, one indicator for MaxMttDepth, one indicator for MaxBtSizeY and one indicator for MaxTtSizeY are signaled, in this case, the adjustability of the tradeoff between partition complexity and the coding efficiency from partition is individually by different pictures.

The PPS level signaling of partition constraint syntax elements also can be signaled in two groups based on slice type, for example, in the PPS one intra slice indicator for MinQtSizeY, one inter slice indicator for the MinQtSizeY, one intra slice indicator for MaxMttDepth, one inter indicator for MaxMttDepth, one intra slice indicator for MaxBtSizeY, one inter slice indicator for MaxBtSizeY, one intra slice indicator for MaxTtSizeY and one inter slice indicator for MaxTtSizeY are signaled, in this case, the adjustability of the tradeoff between partition complexity and the coding efficiency from partition is individually by the type of slice (intra or inter).

The PPS level signaling of partition constraint syntax elements can be signaled in multiple groups based on the identification (e.g. index) of slice, for example, if one picture is split into three slices, in the PPS three different indicators based on the slice identifications for MinQtSizeY, three different indicators based on the slice identifications for MaxMttDepth and three different indicators based on the slice identifications for MaxBtSizeY and three different indicators based on the slice identifications for MaxTtSizeY are signaled, in this case, the adjustability of the tradeoff between partition complexity and the coding efficiency from partition is individually by slice.

Compared with the method in embodiment 1, the advantage of this alternative implementation is that the indication structure is simplified. In this method, to flexible adjust the tradeoff between partition complexity and the coding gain from partition, the overriding of partition constraint syntax element in the slice header is no needed.

On the other hand, compare with the method in embodiment 1 this alternative implementation is limited in some scenarios. This method only signals the partition constraints in PPS. It means there is no possibility to adjust the tradeoff between partition complexity and the coding gain from partition individually by pictures, if multiple pictures refer to the same PPS. Besides, if the adjustment is only necessary for key pictures, this method will signal redundant information in the PPS.

the plurality of partition constraint syntax elements is signaled at a parameter set (such as PPS, VPS, SPS) level or headers(such a picture header, slice header or tile header).

In embodiment 2 of the disclosure:

The embodiments, means

Partition high level syntax constraint elements can be signaled in SPS.

Partition high level syntax constraint elements can be overridden in Slice header.

Partition high level syntax constraint elements can use default values.

BT and TT can be disabled in SPS.

BT and TT can be disabled in Slice header.

BT and TT enabled(disabled) flag can be signaled in SPS and override in Slice header.

Technique advantage (for example signaling in SPS, overriding in slice header): The high level partition constraint controls the tradeoff between partition complexity and the coding efficiency from partition. Embodiments of the invention make sure the flexibility to control the tradeoff for individual slice. For default values and Bt Tt enabling (disabling function), there is even more flexibility in the control the elements.

Both encoder and decoding do the same (corresponding) operations

The corresponding modifications based on prior art are shown below:

Modified Sequence parameter set RBSP syntax (Section 7.3.2.1 of [JVET-K1001-v4])

[Ed. (BB): Preliminary basic SPS, subject to further study and pending further specification development.]

| | Descriptor |
|---|---|
| seq_parameter_set_rbsp( ) { | |
|     sps_seq_parameter_set_id | ue(v) |
|     chroma_format_idc | ue(v) |
|     if( chroma_format_idc = = 3 ) | |
|         separate_colour_plane_flag | u(1) |
|     pic_width_in_luma_samples | ue(v) |
|     pic_height_in_luma_samples | ue(v) |
|     bit_depth_luma_minus8 | ue(v) |
|     bit_depth_chroma_minus8 | ue(v) |
|     qtbtt_dual_tree_intra_flag | ue(v) |
|     log2_ctu_size_minus2 | ue(v) |
|     partition_constraint_control_present_flag | ue(v) |
|     if (partition_constraint_control_present_flag) { | |
|         partition_constraint_override_enabled_flag | ue(v) |
|         sps_btt_enabled_flag | ue(v) |
|         if (sps_btt_enabled_flag) { | |
|             sps_log2_min_qt_size_intra_slices_minus2 | ue(v) |
|             sps_log2_min_qt_size_inter_slices_minus2 | ue(v) |
|             sps_max_mtt_hierarchy_depth_inter_slices | ue(v) |
|             sps_max_mtt_hierarchy_depth_intra_slices | ue(v) |
|             sps_log2_diff_ctu_max_bt_size_intra_slices | ue(v) |

-continued

| | Descriptor |
|---|---|
|         sps_log2_diff_ctu_max_bt_size_inter_slices | ue(v) |
|       } | |
|   } | |
|   sps_cclm_enabled_flag | ue(1) |
|   sps_mts_intra_enabled_flag | ue(1) |
|   sps_mts_inter_enabled_flag | ue(1) |
|   rbsp_trailing_bits( ) | |
| } | |

Modified Slice header syntax (Section 7.3.3 of [JVET-K1001-v4])
[Ed. (BB): Preliminary basic slice header, subject to further study and pending further specification development.]

| | Descriptor |
|---|---|
| slice_header( ) { | |
|   slice_pic_parameter_set_id | ue(v) |
|   slice_address | u(v) |
|   slice_type | ue(v) |
|   if (partition_constraint_override_enabled_flag) { | |
|     partition_constraint_override_flag | ue(v) |
|     if (partition_constraint_override_flag) { | |
|       slice_btt_enabled_flag | |
|       if (slice_btt_enalbed_flag) { | |
|         log2_min_qt_size_minus2 | ue(v) |
|         max_mtt_hierarchy_depth | ue(v) |
|         log2_diff_ctu_max_bt_size | ue(v) |
|       } | |
|     } | |
|   } | |
|   ~~if( slice_type ! I )~~ | |
|     ~~log2_diff_ctu_max_bt_size~~ | ~~ue(v)~~ |
|   dep_quant_enabled_flag | u(1) |
|   if( !dep_quant_enabled flag ) | |
|     sign_data_hiding_enabled_flag | u(1) |
|   byte_alignment( ) | |
| } | |

Modified Sequence parameter set RBSP semantics (Section 7.4.3.1 of [JVET-K1001-v4])
. . .
partition_constraint_control_present_flag equal to 1 specifies the presence of partition constraint control syntax elements in the SPS. partition constraint control present flag equal to 0 specifies the absence of partition constraint control syntax elements in the SPS.
sps_btt_enabled_flag equal to 1 specifies that the operation of the multi-type tree partition is applied for slices referring to the SPS in which slice_btt_enable_flag is not present. sps_btt_enabled_flag equal to 0 specifies that the operation of the multi-type tree partition is not applied for slices referring to the SPS in which slice_btt_enable_flag is not present. When not present, the value of sps_btt_enabled_flag is inferred to be equal to 1.
partition_constraint_override_enabled_flag equal to 1 specifies the presence of partition_constraint_override_flag in the slice headers for slices referring to the SPS. partition_constraint_override_enabled_flag equal to 0 specifies the absence of partition_constraint_override_flag in the slice headers for slices referring to the SPS. When not present, the value of partition_constraint_override_enabled_flag is inferred to be equal to 0.
sps_log2_min_qt_size_intra_slices_minus2 plus 2 specifies the initial value of minimum luma size in the SPS of a leaf block resulting from quadtree splitting of a CTU in slices with slice type equal to 2 (I) referring to the SPS, unless the initial value of minimum luma sizes of a leaf block resulting from quadtree splitting of a CTU are overridden by the minimum luma sizes of a leaf block resulting from quadtree splitting of a CTU present in the slice header of the slices referring to the SPS. The value of log2_min_qt_size_intra_slices_minus2 shall be in the range of 0 to CtbLog2SizeY−2, inclusive. When not present, the value of sps_log2_min_qt_size_intra_slices_minus2 is inferred to be equal to 0.
sps_log2_min_qt_size_inter_slices_minus2 plus 2 specifies the initial value of minimum luma size in the SPS of a leaf block resulting from quadtree splitting of a CTU in slices with slice type equal to 0 (B) or 1 (P) referring to the SPS, unless the initial value of minimum luma sizes of a leaf block resulting from quadtree splitting of a CTU are overridden by the minimum luma sizes of a leaf block resulting from quadtree splitting of a CTU present in the slice header of the slices referring to the SPS. The value of log2_min_qt_size_inter_slices_minus2 shall be in the range of 0 to CtbLog2SizeY−2, inclusive. When not present, the value of sps_log2_min_qt_size_inter_slices_minus2 is inferred to be equal to 0.
sps_max_mtt_hierarchy_depth_inter_slices specifies the initial value of maximum hierarchy depth in the SPS for coding units resulting from multi-type tree splitting of a quadtree leaf in slices with slice type equal to 0 (B) or 1 (P) referring to the SPS, unless the initial value of maximum hierarchy depths for coding units resulting from multi-type tree splitting of a quadtree leaf are overridden by the maximum hierarchy depths for coding units resulting from multi-type tree splitting of a quadtree leaf present in the slice header of the slices referring to the SPS. The value of max_mtt_hierarchy_depth_inter_slices shall be in the range of 0 to CtbLog2SizeY−MinTbLog2SizeY, inclusive. When not present, if the sps_btt_enabled_flag is equal to 1
   the value of sps_max_mtt_hierarchy_depth_inter_slices is inferred to be equal to 3.
Otherwise
   the value of sps_max_mtt_hierarchy_depth_inter_slices is inferred to be equal to 0.
sps_max_mtt_hierarchy_depth_intra_slices specifies the initial value of maximum hierarchy depth in the SPS for coding units resulting from multi-type tree splitting of a quadtree leaf in slices with slice_type equal to 2 (I) referring to the SPS, unless the initial value of maximum hierarchy depths for coding units resulting from multi-type tree splitting of a quadtree leaf are overridden by the maximum hierarchy depths for coding units resulting from multi-type tree splitting of a quadtree leaf present in the slice header of the slices referring to the SPS. The value of max_mtt_hierarchy_depth_intra_slices shall be in the range of 0 to CtbLog2SizeY−MinTbLog2SizeY, inclusive. When not present, if the sps_btt_enabled_flag is equal to 1
 the value of sps_max_mtt_hierarchy_depth_intra_slices is inferred to be equal to 3.
Otherwise
 the value of sps_max_mtt_hierarchy_depth_intra_slices is inferred to be equal to 0.
sps_log2_diff_ctu_max_bt_size_intra_slices specifies the initial value of difference between the luma CTB size and the maximum luma size (width or height) in the SPS of a coding block that can be split using a binary split in slices with slice_type equal to 2 (I) referring to the SPS, unless the initial value of differences between the luma CTB size and the maximum luma size (width or height) in the SPS of a coding block that can be split using a binary split are overridden by the differences between the luma CTB size and the maximum luma size (width or height) of a coding block that can be split using a binary split present in the slice header of the slices referring to the SPS. The value of log2_diff_ctu_max_bt_size shall be in the range of 0 to CtbLog2SizeY−MinCbLog2SizeY, inclusive. When not present,
if the sps_btt_enabled_flag is equal to 1
 the value of sps_log2_diff_ctu_max_bt_size_intra_slices is inferred to be equal to 2.
Otherwise
 the value of sps_log2_diff_ctu_max_bt_size_intra_slices is inferred to be equal to CtbLog2SizeY−MinCbLog2SizeY.
sps_log2_diff_ctu_max_bt_size_inter_slices specifies the initial value of difference between the luma CTB size and the maximum luma size (width or height) in the SPS of a coding block that can be split using a binary split in slices with slice_type equal to 0 (B) or 1 (P) referring to the SPS, unless the initial value of differences between the luma CTB size and the maximum luma size (width or height) in the SPS of a coding block that can be split using a binary split are overridden by the differences between the luma CTB size and the maximum luma size (width or height) of a coding block that can be split using a binary split present in the slice header of the slices referring to the SPS. The value of log2_diff_ctu_max_bt_size shall be in the range of 0 to CtbLog2SizeY−MinCbLog2SizeY, inclusive. When not present,
if the sps_btt_enabled_flag is equal to 1
 the value of sps_log2_diff_ctu_max_bt_size_inter_slices is inferred to be equal to 0.
Otherwise
 the value of sps_log2_diff_ctu_max_bt_size_inter_slices is inferred to be equal to CtbLog2SizeY−MinCbLog2SizeY.
. . .
Modified Slice header semantics (Section 7.4.4 of [JVET-K1001-v4])
. . .
partition_constraint_override_flag equal to 1 specifies that partition constraint parameters are present in the slice header. partition_constraint_override_flag equal to 0 specifies that partition constraints parameters are not present in the slice header. When not present, the value of partition constraints override flag is inferred to be equal to 0.
slice_btt_enabled_flag equal to 1 specifies that the operation of the multi-type tree partition is applied for the current slice. slice_btt_enabled_flag equal to 0 specifies that the operation of the multi-type tree partition is not applied for the current slice. When slice_btt_enabled_flag is not present, it is inferred to be equal to sps_btt_enabled_flag.
log2_min_qt_size_minus2 plus 2 specifies the minimum luma size of a leaf block resulting from quadtree splitting of a CTU fur the current slice. The value of log2_min_qt_size_inter_slices_minus2 shall be in the range of 0 to CtbLog2SizeY−2, inclusive. When not present, the values of log2_min_qt_size_minus2 is inferred to be equal to sps_log2_min_qt_size_intra_slices_minus2 with slice_type equal to 2 (I) and inferred to be equal to sps_log2_min_qt_size_inter_slices_minus2 with slice_type equal to 0 (B) or 1 (P).
max_mtt_hierarchy_depth specifies the maximum hierarchy depth for coding units resulting from multi-type tree splitting of a quadtree leaf for the current slice. The value of max_mtt_hierarchy_depth_intra_slices shall be in the range of 0 to CtbLog2SizeY−MinTbLog2SizeY, inclusive. When not present, the values of max_mtt_hierarchy_depth is inferred to be equal to sps_max_mtt_hierarchy_depth_intra_slices with slice_type equal to 2 (I) and inferred to be equal to sps_max_mtt_hierarchy_depth_inter_slices with slice_type equal to 0 (B) or 1 (P).
log2_diff_ctu_max_bt_size specifies the difference between the luma CTB size and the maximum luma size (width or height) of a coding block that can be split using a binary split for the current slice. The value of log2_diff_ctu_max_bt_size shall be in the range of 0 to CtbLog2SizeY−MinCbLog2SizeY, inclusive. When not present, the values of log2_diff_ctu_max_bt_size is inferred to be equal to sps_log2_diff_ctu_max_bt_size_intra_slices with slice_type equal to 2 (I) and inferred to be equal to sps_log2_diff_ctu_max_bt_size_inter_slices with slice_type equal to 0 (B) or 1 (P).
The variables MinQtLog2SizeY, MaxBtLog2SizeY, MinBtLog2SizeY, MaxTtLog2SizeY, MinTtLog2SizeY, MaxBtSizeY, MinBtSizeY, MaxTtSizeY, MinTtSizeY and MaxMttDepth are derived as follows:

$$\text{MinQtLog2SizeY} = \text{log2\_min\_qt\_size\_minus2} + 2 \quad (7\text{-}25)$$

$$\text{MaxBtLog2SizeY} = \text{CtbLog2SizeY} - \text{log2\_diff\_ctu\_max\_bt\_size} \quad (7\text{-}26)$$

$$\text{MinBtLog2SizeY} = \text{MinCbLog2SizeY} \quad (7\text{-}27)$$

$$\text{MaxTtLog2SizeY} = (\text{slice type} == I)?5:6 \quad (7\text{-}28)$$

$$\text{MinTtLog2SizeY} = \text{MinCbLog2SizeY} \quad (7\text{-}29)$$

$$\text{MinQtSizeY} = 1 << \text{MinQtLog2SizeY} \quad (7\text{-}30)$$

$$\text{MaxBtSizeY} = 1 << \text{MaxBtLog2SizeY} \quad (7\text{-}31)$$

$$\text{MinBtSizeY} = 1 << \text{MinBtLog2SizeY} \quad (7\text{-}32)$$

$$\text{MaxTtSizeY} = 1 << \text{MaxTtLog2SizeY} \quad (7\text{-}33)$$

$$\text{MinTtSizeY} = 1 << \text{MinTtLog2SizeY} \quad (7\text{-}34)$$

$$\text{MaxMttDepth} = 1 << \text{max\_mtt\_hierarchy\_depth} \quad (7\text{-}35)$$

In embodiment 3 of the disclosure:
If the MaxTTSizeY (maximum luma size (width or height) of a coding block that can be split using a ternary split) is signaled in SPS (or other parameter set or Slice header), the embodiment 1 or embodiment 2 could be applied in the same manner as for the other above-mentioned partitioning parameters.

Technique advantage: Embodiments of the invention for the signaling the indicator of MaxTtSizeY syntax elements make sure that there is more flexibility in the control the elements.

Both encoder and decoding do the same (corresponding) operations.

The syntax changes are based on embodiment 1 or embodiment 2.

Modified Sequence parameter set RBSP syntax (Section 7.3.2.1 of [JVET-K1001-v4])

|  | Descriptor |
|---|---|
| seq_parameter_set_rbsp( ) { |  |
|     sps_seq_parameter_set_id | ue(v) |
|     chroma_format_idc | ue(v) |
|     if( chroma_format_idc = = 3 ) |  |
|         separate_colour_plane_flag | u(1) |
|     pic_width_in_luma_samples | ue(v) |
|     pic_height_in_luma_samples | ue(v) |
|     bit_depth_luma_minus8 | ue(v) |
|     bit_depth_chroma_minus8 | ue(v) |
|     qtbtt_dual_tree_intra_flag | ue(v) |
|     log2_ctu_size_minus2 | ue(v) |
|     partition_constraint_override_enabled_flag | ue(v) |
|     sps_log2_min_qt_size_intra_slices_minus2 | ue(v) |
|     sps_log2_min_qt_size_inter_slices_minus2 | ue(v) |
|     sps_max_mtt_hierarchy_depth_inter_slices | ue(v) |
|     sps_max_mtt_hierarchy_depth_intra_slices | ue(v) |
|     sps_log2_diff_ctu_max_bt_size_intra_slices | ue(v) |
|     sps_log2_diff_ctu_max_bt_size_inter_slices | ue(v) |
|     sps_log2_diff_ctu_max_tt_size_intra_slices | ue(v) |
|     sps_log2_diff_ctu_max_tt_size_inter_slices | ue(v) |
|     sps_cclm_enabled_flag | ue(1) |
|     sps_mts_intra_enabled_flag | ue(1) |
|     sps_mts_inter_enabled_flag | ue(1) |
|     rbsp_trailing_bits( ) |  |
| } |  |

Modified Slice header syntax (Section 7.3.3 of [JVET-K1001-v4])

[Ed. (BB): Preliminary basic slice header, subject to further study and pending further specification development.]

|  | Descriptor |
|---|---|
| slice_header( ) { |  |
|     slice_pic_parameter_set_id | ue(v) |
|     slice_address | u(v) |
|     slice_type | ue(v) |
|     if (partition_constraint_override_enabled_flag) { |  |
|         partition_constraint_override_flag | ue(v) |
|         if (partition_constraint_override_flag) { |  |
|             log2_min_qt_size_minus2 | ue(v) |
|             max_mtt_hierarchy_depth | ue(v) |
|             log2_diff_ctu_max_bt_size | ue(v) |
|             log2_diff_ctu_max_tt_size |  |
|         } |  |
|     } |  |
|     ~~if( slice_type != I )~~ |  |
|         ~~log2_diff_ctu_max_bt_size~~ | ~~ue(v)~~ |
|     dep_quant_enabled_flag | u(1) |
|     if( !dep_quant_enabled_flag ) |  |
|         sign_data_hiding_enabled_flag | u(1) |
|     byte_alignment( ) |  |
| } |  |

In embodiment 4 of the disclosure:

Separate the btt_enabled_flag of embodiment 2 as bt_enalbed_flag and tt_eabled_flag to enable or disable bt and tt splitting separately.

Technique advantage: signaling BT enabling flag and TT enabling flag separately provides more flexibility to control the partition constraint syntax elements.

Both encoder and decoding do the same (corresponding) operations.

The syntax and semantic changes based on embodiment 2:

Modified Sequence parameter set RBSP syntax (Section 7.3.2.1 of [JVET-K1001-v4])

[Ed. (BB): Preliminary basic SPS, subject to further study and pending further specification development.]

|  | Descriptor |
|---|---|
| seq_parameter_set_rbsp( ) { |  |
|     sps_seq_parameter_set_id | ue(v) |
|     chroma_format_idc | ue(v) |
|     if( chroma_format_idc = = 3 ) |  |
|         separate_colour_plane_flag | u(1) |
|     pic_width_in_luma_samples | ue(v) |
|     pic_height_in_luma_samples | ue(v) |
|     bit_depth_luma_minus8 | ue(v) |
|     bit_depth_chroma_minus8 | ue(v) |
|     qtbtt_dual_tree_intra_flag | ue(v) |
|     log2_ctu_size_minus2 | ue(v) |
|     partition_constraint_control_present_flag | ue(v) |
|     if (partition_constraint_control_present_flag) { |  |
|         partition_constraint_override_enabled_flag | ue(v) |
|         sps_bt_enabled_flag |  |
|         sps_tt_enabled_flag |  |
|         if (sps_bt_enabled_flag || sps_tt_enabled_flag) { |  |
|             sps_log2_min_qt_size_intra_slices_minus2 | ue(v) |
|             sps_log2_min_qt_size_inter_slices_minus2 | ue(v) |
|             sps_max_mtt_hierarchy_depth_inter_slices | ue(v) |
|             sps_max_mtt_hierarchy_depth_intra_slices | ue(v) |
|         } |  |
|         if (sps_bt_enabled_flag){ |  |
|             sps_log2_diff_ctu_max_bt_size_intra_slices | ue(v) |
|             sps_log2_diff_ctu_max_bt_size_inter_slices | ue(v) |
|         } |  |
|         if (sps_tt_enabled_flag){ |  |
|             sps_log2_diff_ctu_max_tt_size_inter_slices |  |
|             sps_log2_diff_ctu_max_tt_size_intra_slices |  |
|         } |  |
|     } |  |
| } |  |

-continued

| | Descriptor |
|---|---|
| sps_cclm_enabled_flag | ue(1) |
| sps_mts_intra_enabled_flag | ue(1) |
| sps_mts_inter_enabled_flag | ue(1) |
| rbsp_trailing_bits( ) | |
| } | |

Modified Slice header syntax (Section 7.3.3 of [JVET-K1001-v4])
[Ed. (BB): Preliminary basic slice header, subject to further study and pending further specification development.]

| | Descriptor |
|---|---|
| slice_header( ) { | |
|     slice_pic_parameter_set_id | ue(v) |
|     slice_address | u(v) |
|     slice_type | ue(v) |
|     if (partition_constraint_override_enabled_flag) { | |
|         partition_constraint_override_flag | ue(v) |
|         if (partition_constraint_override_flag) { | |
|             slice_bt_enabled_flag | |
|             slice_tt_enabled_flag | |
|             if (slice_bt_enalbed_flag \|\| | |
|                 slice_tt_enabled_flag) { | |
|                 log2_min_qt_size_minus2 | ue(v) |
|                 max_mtt_hierarchy_depth | ue(v) |
|             } | |
|             if (slice_bt_enabled_flag) | |
|                 log2_diff_ctu_max_bt_size | ue(v) |
|             if (slice_tt_enabled_flag) | |
|                 log2_diff_ctu_max_tt_size | |
|             } | |
|         } | |
|     } | |
|     ~~if( slice_type != I )~~ | |
|         ~~log2_diff_ctu_max_bt_size~~ | ~~ue(v)~~ |
|     dep_quant_enabled_flag | u(1) |
|     if( !dep_quant_enabled_flag ) | |
|         sign_data_hiding_enabled_flag | u(1) |
|     byte_alignment( ) | |
| } | |

Sequence parameter set RBSP semantics (Section 7.4.3.1 of [JVET-K1001-v4])
. . .
partition_constraint_control_present_flag equal to 1 specifies the presence of partition constraint control syntax elements in the SPS. partition constraint control present flag equal to 0 specifies the absence of partition constraint control syntax elements in the SPS.
sps_bt_enabled_flag equal to 1 specifies that the operation of the binary tree partition is applied for slices referring to the SPS in which slice_bt_enable_flag is not present. sps_bt_enabled_flag equal to 0 specifies that the operation of the binary tree partition is not applied for slices referring to the SPS in which slice_bt_enable_flag is not present. When not present, the value of sps_bt_enabled_flag is inferred to be equal to 1.
sps_tt_enabled_flag equal to 1 specifies that the operation of the ternary tree partition is applied for slices referring to the SPS in which slice_tt_enable_flag is not present. sps_tt_enabled_flag equal to 0 specifies that the operation of the ternary tree partition is not applied for slices referring to the SPS in which slice_tt_enable_flag is not present. When not present, the value of sps_tt_enabled_flag is inferred to be equal to 1.

partition_constraint_override_enabled_flag equal to 1 specifies the presence of partition_constraint_override_flag in the slice headers for slices referring to the SPS. partition_constraint_override_enabled_flag equal to 0 specifies the absence of partition_constraint_override_flag in the slice headers for slices referring to the SPS. When not present, the value of partition_constraint_override_enabled_flag is inferred to be equal to 0.
sps_log2_min_qt_size_intra_slices_minus2 plus 2 specifies the default minimum luma size of a leaf block resulting from quadtree splitting of a CTU in slices with slice type equal to 2 (I) referring to the SPS, unless the default minimum luma sizes of a leaf block resulting from quadtree splitting of a CTU are overridden by the minimum luma sizes of a leaf block resulting from quadtree splitting of a CTU present in the slice header of the slices referring to the SPS. The value of log2_min_qt_size_intra_slices_minus2 shall be in the range of 0 to CtbLog2SizeY−2, inclusive. When not present, the value of sps_log2_min_qt_size_intra_slices_minus2 is inferred to be equal to 0.
sps_log2_min_qt_size_inter_slices_minus2 plus 2 specifies the default minimum luma size of a leaf block resulting from quadtree splitting of a CTU in slices with slice type equal to 0 (B) or 1(P) referring to the SPS, unless the default minimum luma sizes of a leaf block resulting from quadtree splitting of a CTU are overridden by the minimum luma sizes of a leaf block resulting from quadtree splitting of a CTU present in the slice header of the slices referring to the SPS. The value of log2_min_qt_size_inter_slices_minus2 shall be in the range of 0 to CtbLog2SizeY−2, inclusive. When not present, the value of sps_log2_min_qt_size_inter_slices_minus2 is inferred to be equal to 0.
sps_max_mtt_hierarchy_depth_inter_slices specifies the default maximum hierarchy depth for coding units resulting from multi-type tree splitting of a quadtree leaf in slices with slice_type equal to 0 (B) or 1 (P) referring to the SPS, unless the default maximum hierarchy depths for coding units resulting from multi-type tree splitting of a quadtree leaf are overridden by the maximum hierarchy depths for coding units resulting from multi-type tree splitting of a quadtree leaf present in the slice header of the slices referring to the SPS. The value of max_mtt_hierarchy_depth_inter_slices shall be in the range of 0 to CtbLog2SizeY−MinTbLog2SizeY, inclusive. When not present,
if the sps_bt_enabled_flag is equal to 1 or sps_tt_enabled_flag is equal to 1
    the value of sps_max_mtt_hierarchy_depth_inter_slices is inferred to be equal to 3.
Otherwise
    the value of sps_max_mtt_hierarchy_depth_inter_slices is inferred to be equal to 0.
sps_max_mtt_hierarchy_depth_intra_slices specifies the default maximum hierarchy depth for coding units resulting from multi-type tree splitting of a quadtree leaf in slices with slice_type equal to 2 (I) referring to the SPS, unless the default maximum hierarchy depths for coding units resulting from multi-type tree splitting of a quadtree leaf are overridden by the maximum hierarchy depths for coding units resulting from multi-type tree splitting of a quadtree leaf present in the slice header of the slices referring to the SPS. The value of max_mtt_hierarchy_depth_intra_slices shall be in the range of 0 to CtbLog2SizeY−MinTbLog2SizeY, inclusive. When not present,
if the sps_btt_enabled_flag is equal to 1 sps_tt_enabled_flag is equal to 1
    the value of sps_max_mtt_hierarchy_depth_intra_slices is inferred to be equal to 3.
Otherwise
    the value of sps_max_mtt_hierarchy_depth_intra_slices is inferred to be equal to 0.
sps_log2_diff_ctu_max_bt_size_intra_slices specifies the default difference between the luma CTB size and the maximum luma size (width or height) of a coding block that can be split using a binary split in slices with slice_type equal to 2 (I) referring to the SPS, unless the default differences between the luma CTB size and the maximum luma size (width or height) of a coding block that can be split using a binary split are overridden by the differences between the luma CTB size and the maximum luma size (width or height) of a coding block that can be split using a binary split present in the slice header of the slices referring to the SPS. The value of log2_diff_ctu_max_bt_size shall be in the range of 0 to CtbLog2SizeY−MinCbLog2SizeY, inclusive. When not present,
if the sps_bt_enabled_flag is equal to 1
    the value of sps_log2_diff_ctu_max_bt_size_intra_slices is inferred to be equal to 2.
Otherwise
    the value of sps_log2_diff_ctu_max_bt_size_intra_slices is inferred to be equal to CtbLog2SizeY−MinCbLog2SizeY.
sps_log2_diff_ctu_max_bt_size_inter_slices specifies the default difference between the luma CTB size and the maximum luma size (width or height) of a coding block that can be split using a binary split in slices with slice type equal to 0 (B) or 1 (P) referring to the SPS, unless the default differences between the luma CTB size and the maximum luma size (width or height) of a coding block that can be split using a binary split are overridden by the differences between the luma CTB size and the maximum luma size (width or height) of a coding block that can be split using a binary split present in the slice header of the slices referring to the SPS. The value of log2_diff_ctu_max_bt_size shall be in the range of 0 to CtbLog2SizeY−MinCbLog2SizeY, inclusive. When not present,
if the sps_bt_enabled_flag is equal to 1
    the value of sps_log2_diff_ctu_max_bt_size_inter_slices is inferred to be equal to 0.
Otherwise
    the value of sps_log2_diff_ctu_max_bt_size_inter_slices is inferred to be equal to CtbLog2SizeY−MinCbLog2SizeY.
sps_log2_diff_ctu_max_tt_size_intra_slices specifies the default difference between the luma CTB size and the maximum luma size (width or height) of a coding block that can be split using a ternary split in slices with slice type equal to 2 (I) referring to the SPS, unless the default differences between the luma CTB size and the maximum luma size (width or height) of a coding block that can be split using a ternary split are overridden by the differences between the luma CTB size and the maximum luma size (width or height) of a coding block that can be split using a ternary split present in the slice header of the slices referring to the SPS. The value of sps_log2_diff_ctu_max_tt_size shall be in the range of 0 to CtbLog2SizeY−MinCbLog2SizeY, inclusive. When not present,
if the sps_tt_enabled_flag is equal to 1
    the value of sps_log2_diff_ctu_max_tt_size_intra_slices is inferred to be equal to 2.
Otherwise
    the value of sps_log2_diff_ctu_max_tt_size_intra_slices is inferred to be equal to CtbLog2SizeY−MinCbLog2SizeY.
sps_log2_diff_ctu_max_tt_size_inter_slices specifies the default difference between the luma CTB size and the maximum luma size (width or height) of a coding block that can be split using a ternary split in slices with slice type equal to 0 (B) or 1 (P) referring to the SPS, unless the default differences between the luma CTB size and the maximum luma size (width or height) of a coding block that can be split using a ternary split are overridden by the differences between the luma CTB size and the maximum luma size (width or height) of a coding block that can be split using a ternary split present in the slice header of the slices referring to the SPS. The value of log2_diff_ctu_max_tt_size shall be in the range of 0 to CtbLog2SizeY−MinCbLog2SizeY, inclusive. When not present,
if the sps_tt_enabled_flag is equal to 1
    the value of sps_log2_diff_ctu_max_tt_size_inter_slices is inferred to be equal to 1.
Otherwise
    the value of sps_log2_diff_ctu_max_tt_size_inter_slices is inferred to be equal to CtbLog2SizeY−MinCbLog2SizeY.
. . .
Modified Slice header semantics (Section 7.4.4 of [JVET-K1001-v4])
. . .
partition_constraint_override_flag equal to 1 specifies that partition constraint parameters are present in the slice header. partition_constraint_override_flag equal to 0 specifies that partition constraints parameters are not present in the slice header. When not present, the value of partition constraints override flag is inferred to be equal to 0.
slice_btt_enabled_flag equal to 1 specifies that the operation of the multi-type tree partition is not applied for the current slice. slice_btt_enabled_flag equal to 0 specifies that the operation of the multi-type tree partition is applied for the current slice. When slice_btt_enabled_flag is not present, it is inferred to be equal to sps_btt_enabled_flag.
log2_min_qt_size_minus2 plus 2 specifies the minimum luma size of a leaf block resulting from quadtree splitting of a CTU fur the current slice. The value of log2_min_qt_size_inter_slices_minus2 shall be in the range of 0 to CtbLog2SizeY−2, inclusive. When not present, the values of log2_min_qt_size_minus2 is inferred to be equal to sps_log2_min_qt_size_intra_slices_minus2 with slice type equal to 2 (I) and inferred to be equal to sps_log2_min_qt_size_inter_slices_minus2 with slice type equal to 0 (B) or 1 (P).
max_mtt_hierarchy_depth specifies the maximum hierarchy depth for coding units resulting from multi-type tree splitting of a quadtree leaf for the current slice. The value of max_mtt_hierarchy_depth_intra_slices shall be in the range of 0 to CtbLog2SizeY−MinTbLog2SizeY, inclusive. When not present, the values of max_mtt_hierarchy_depth is inferred to be equal to sps_max_mtt_hierarchy_depth_intra_slices with slice type equal to 2 (I) and inferred to be equal to sps_max_mtt_hierarchy_depth_inter_slices with slice type equal to 0 (B) or 1 (P).
log2_diff_ctu_max_bt_size specifies the difference between the luma CTB size and the maximum luma size (width or height) of a coding block that can be split using a binary split for the current slice. The value of log2_diff_ctu_max_bt_size shall be in the range of 0 to CtbLog2SizeY−MinCbLog2SizeY, inclusive. When not present, the values of log2_diff_ctu_max_bt_size is inferred to be equal to sps_log2_diff_ctu_max_bt_size_intra_slices with slice type equal to 2 (I) and inferred to be equal to sps_log2_diff_ctu_max_bt_size_inter_slices with slice type equal to 0 (B) or 1 (P).

log2_diff_ctu_max_tt_size specifies the difference between the luma CTB size and the maximum luma size (width or height) of a coding block that can be split using a binary split for the current slice. The value of log2_diff_ctu_max_tt_size shall be in the range of 0 to CtbLog2SizeY−MinCbLog2SizeY, inclusive. When not present, the values of log2_diff_ctu_max_tt_size is inferred to be equal to sps_log2_diff_ctu_max_tt_size_intra_slices with slice type equal to 2 (I) and inferred to be equal to sps_log2_diff_ctu_max_tt_size_inter_slices with slice type equal to 0 (B) or 1 (P).

The variables MinQtLog2SizeY, MaxBtLog2SizeY, MinBtLog2SizeY, MaxTtLog2SizeY, MinTtLog2SizeY, MaxBtSizeY, MinBtSizeY, MaxTtSizeY, MinTtSizeY and MaxMttDepth are derived as follows:

$$\text{MinQtLog2SizeY} = \text{log2\_min\_qt\_size\_minus2} + 2 \quad (7\text{-}25)$$

$$\text{MaxBtLog2SizeY} = \text{CtbLog2SizeY} - \text{log2\_diff\_ctu\_max\_bt\_size} \quad (7\text{-}26)$$

$$\text{MinBtLog2SizeY} = \text{MinCbLog2SizeY} \quad (7\text{-}27)$$

$$\text{MaxTtLog2SizeY} = \text{CtbLog2SizeY} - \text{log2\_diff\_ctu\_max\_tt\_size} \quad (7\text{-}28)$$

$$\text{MinTtLog2SizeY} = \text{MinCbLog2SizeY} \quad (7\text{-}29)$$

$$\text{MinQtSizeY} = 1 << \text{MinQtLog2SizeY} \quad (7\text{-}30)$$

$$\text{MaxBtSizeY} = 1 << \text{MaxBtLog2SizeY} \quad (7\text{-}31)$$

$$\text{MinBtSizeY} = 1 << \text{MinBtLog2SizeY} \quad (7\text{-}32)$$

$$\text{MaxTtSizeY} = 1 << \text{MaxTtLog2SizeY} \quad (7\text{-}33)$$

$$\text{MinTtSizeY} = 1 << \text{MinTtLog2SizeY} \quad (7\text{-}34)$$

$$\text{MaxMttDepth} = 1 << \text{max\_mtt\_hierarchy\_depth} \quad (7\text{-}35)$$

Figure 10:
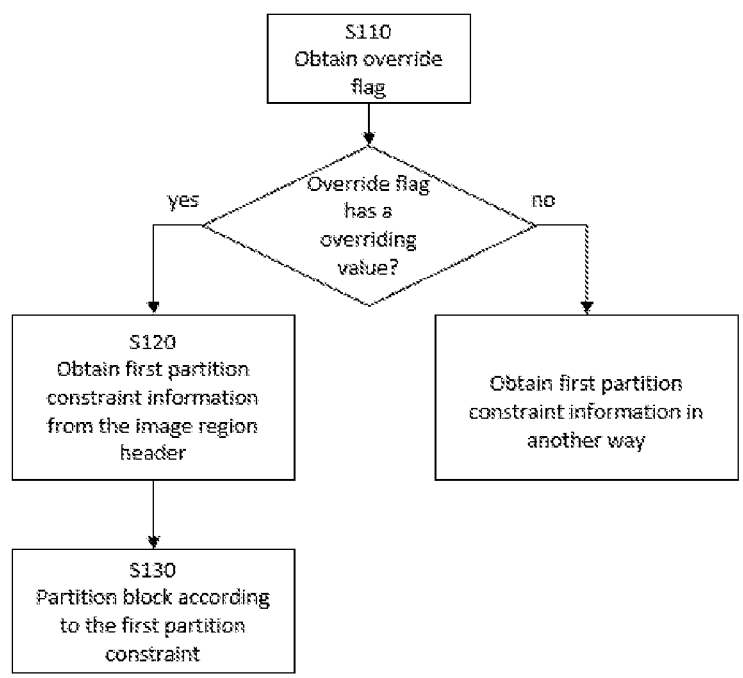
FIG. 10 is a flow diagram illustrating a decoding method according to an embodiment.

FIG. 10 shows the corresponding method of decoding of a video bitstream implemented by a decoding device, wherein the video bitstream includes data representing an image region and an image region header of the image region. The decoding method comprises the steps of obtaining S110 an override flag (partition_constraint_override_flag) from the video bitstream; when the value of the override flag is an overriding value(for example, 1), obtaining S120 first partition constraint information for the image region from the image region header; partitioning S130 a block of the image region according to the first partition constraint information. If the flag is not set, the partition constraint information may be obtained from a source different from the image region header. An image region may be a slice or a tile.

Figure 11:
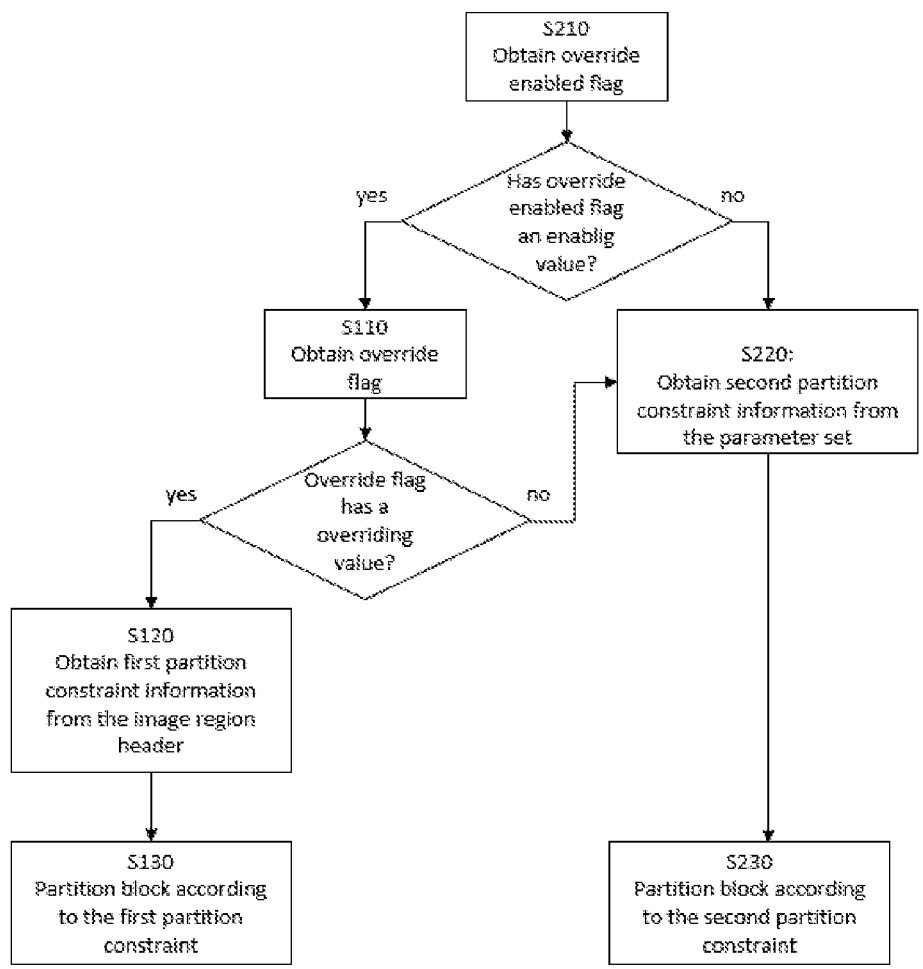
FIG. 11 is a flow diagram illustrating a decoding method according to an embodiment.

FIG. 11 shows a flow chart incorporating the flowchart of FIG. 10. In addition, the method illustrated in the flowchart includes the steps of obtaining S210 an override enabled flag(partition_constraint_override_enabled_flag) from the video bitstream; wherein when the value of the override enabled flag is an enabling value(for example, 1), obtaining S110 the override flag from the video bitstream. Moreover, when the value of the override flag is not the overriding value(for example, the value of the override flag is 0), partitioning S230 the block of the image region may be performed according to second partition constraint information for the video bitstream from the parameter set. Moreover, when the value of the override enabled flag is a disabling value(for example, the value of the override enabled flag is 0), partitioning S230 the block of the image region may be performed according to second partition constraint information for the video bitstream from the parameter set.

For features in the embodiments of the present invention, refer to related the decoding method embodiments above. Details are not described herein again.

Figure 12:
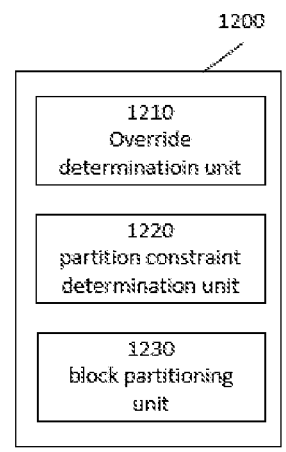
FIG. 12 is a block diagram illustrating an exemplary decoder.

FIG. 12 shows a decoder 1200 for decoding a video bitstream. The video bitstream includes data representing an image region and an image region header of the image region. The decoder comprises: an override determination unit 1210 for obtaining an override flag from the video bitstream; a partition constraint determination unit 1220 for, when the value of the override flag is an overriding value, obtaining first partition constraint information for the image region from the image region header; a block partitioning unit 1230 for partitioning a block of the image region according to the first partition constraint information.

For functions of units in the decoder 1200 in the embodiments of the present invention, refer to related descriptions of the decoding method embodiment of the present invention. Details are not described herein again.

The units in the decoder 1200 may be implemented by software or circuit.

The decoder 1200 may be the decoder 30, video coding device 400, or apparatus 500, or part of the decoder 30, video coding device 400, or apparatus 500.

The encoder 1300 may be the encoder 20, video coding device 400, or apparatus 500, or part of the encoder 20, video coding device 400, or apparatus 500.

Figure 13:
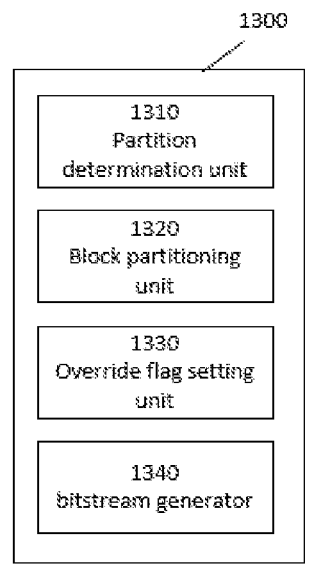
FIG. 13 is a block diagram illustrating an exemplary encoder.

FIG. 13 shows an encoder 1300 for encoding a video bitstream, wherein the video bitstream includes data representing an image region and an image region header of the image region. The encoder comprises: a partitioning determination unit 1310 for determining whether partitioning a block of the image region is according to first partition constraint information in the image region header; a block partitioning unit 1320 for partitioning a block of the image region according to first partition constraint information, when determining that partitioning the block is according to the first partition constraint information; an override flag setting unit 1330 for setting the value of an override flag to an overriding value; and a bitstream generator 1340 for inserting the override flag into the video bitstream.

For functions of units in the encoder 1300 in the embodiments of the present invention, refer to related descriptions of the encoding method embodiment of the present invention. Details are not described herein again.

The units in the encoder 1300 may be implemented by software or circuit.

The encoder 1300 may be the encoder 20, video coding device 400, or apparatus 500, or part of the encoder 20, video coding device 400, or apparatus 500.

Figure 14A:
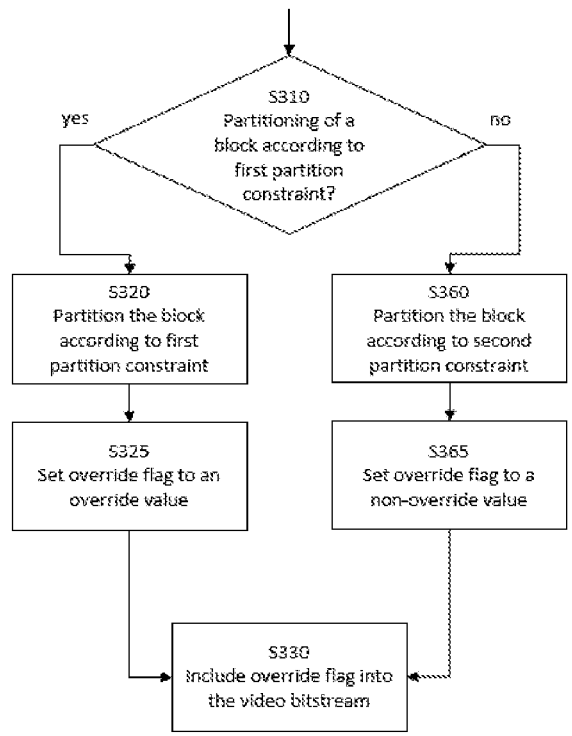
FIG. 14A is a flow diagram illustrating an encoding method according to an embodiment relating to an override flag.

FIG. 14A shows a flow diagram of a method for encoding of a video bitstream implemented by an encoding device, wherein the video bitstream includes data representing an image region and an image region header of the image region. The encoding method comprises the steps of: determining S310 whether partitioning a block of the image region is according to first partition constraint information in the image region header; when determining that partitioning the block is according to the first partition constraint information ("yes" in step S310), partitioning S320 the block of the image region according to the first partition constraint information and setting S325 the value of an override flag to an overriding value; and including S330 the data of the override flag into the video bitstream.

In some exemplary embodiments, when determining that partitioning the block is not according to the first partition constraint information ("no" in step S310), partitioning S360 the block of the image region according to a second partition constraint information and setting S365 the value of an override flag to an overriding value.

Figure 14B:
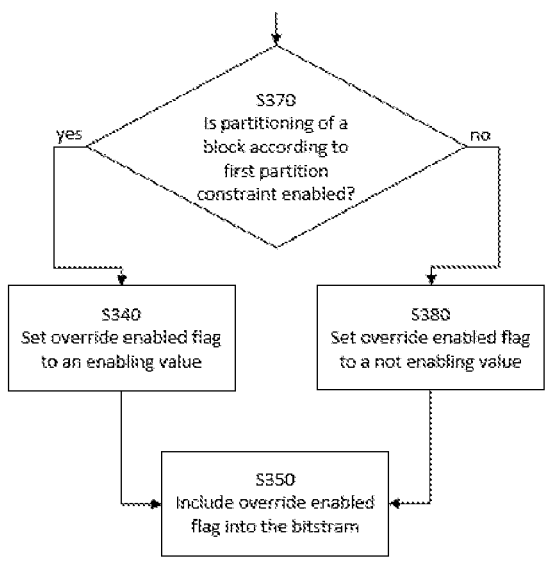
FIG. 14B is a flow diagram illustrating an encoding method according to an embodiment relating to an override enabled flag.

FIG. 14B shows an encoding method comprising the steps of: determining S370 whether or not partitioning the block according to first partition constraint information is enabled. When determining that partitioning the block according to first partition constraint information is (determined to be) enabled, the method includes setting S340 the value of an override enabled flag to an enabling value; and including S350 the data of the override enabled flag into the video bitstream. Moreover, When determining that partitioning the block according to first partition constraint information is (determined to be) enabled, determining S310 whether partitioning a block of the image region is according to first partition constraint information in the image region header.

In some exemplary embodiments, when determining that partitioning the block according to first partition constraint information is (determined to be) not enabled (i.e. is disabled), the method includes setting S380 the value of an override enabled flag to a non-enabling (disabling) value.

For features in the embodiments of the present invention, refer to related the decoding method embodiments above. Details are not described herein again.

Following is an explanation of the applications of the encoding method as well as the decoding method as shown in the above-mentioned embodiments, and a system using them.

FIG. 14 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 15:
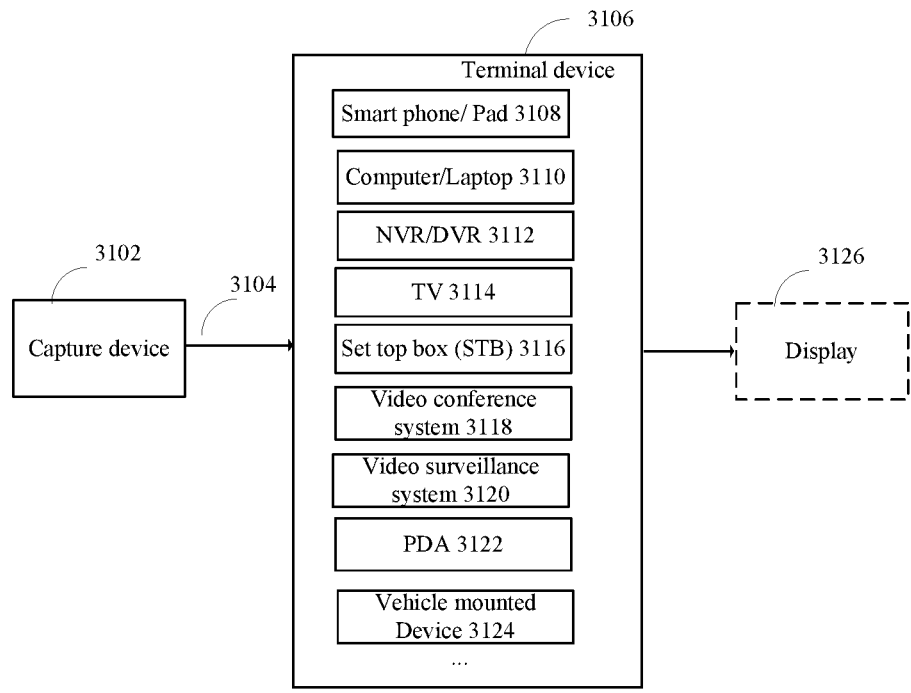
FIG. 15 is a block diagram showing an example structure of a content supply system, which realizes a content delivery service.
Figure 16:
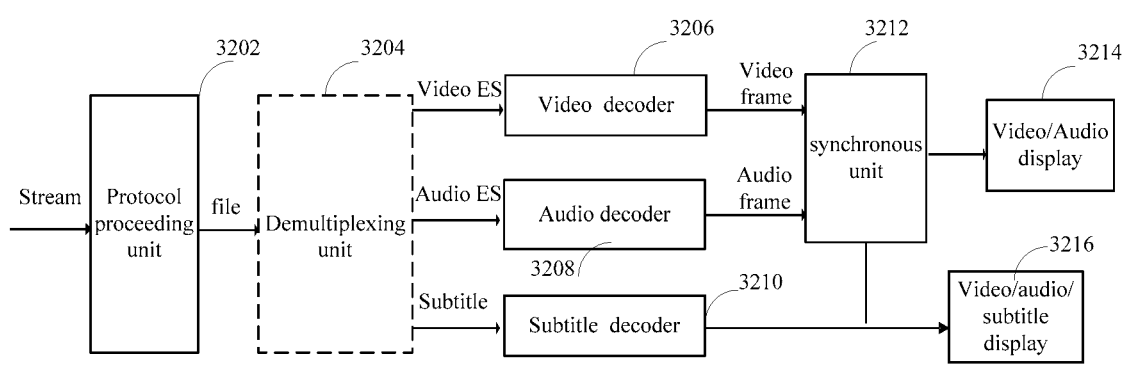
FIG. 16 is a block diagram showing a structure of an example of a terminal device.

FIG. 15 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 15) before feeding it to the synchronous unit

3212. Similarly, the audio frame may store in a buffer (not shown in FIG. 15) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

Embodiments of the present invention are not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Logical Operators

The following logical operators are defined as follows:

x && y Boolean logical "and" of x and y x||y Boolean logical "or" of x and y

! Boolean logical "not"

x?y:z If x is TRUE or not equal to 0, evaluates to the value of y; otherwise, evaluates to the value of z.

Relational Operators

The following relational operators are defined as follows:

\> Greater than

\>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

In an example, a method is provided of encoding implemented by an encoding device, comprising: partitioning a block of an image region according to partition constraint information; generating a bitstream including one or more partition constraint syntax elements, wherein the one or more partition constraint syntax elements indicate the partition constraint information, wherein the one or more partition constraint syntax elements are signaled at a picture parameter set (PPS) level.

For example, the partition constraint information comprises one or more selected from the following: information of minimum allowed quadtree leaf node size (MinQtSizeY), information of maximum multi-type tree depth (MaxMttDepth), information of maximum allowed binary tree root node size (MaxBtSizeY), and information of maximum allowed ternary tree root node size (MaxTtSizeY).

For instance, in some embodiments, the partition constraint information comprises information of minimum allowed quadtree leaf node size(MinQtSizeY), information of maximum multi-type tree depth(MaxMttDepth), and information of maximum allowed binary tree root node size(MaxBtSizeY).

In some embodiments, the partition constraint information comprises information of minimum allowed quadtree leaf node size(MinQtSizeY), information of maximum multi-type tree depth(MaxMttDepth), information of maximum allowed binary tree root node size(MaxBtSizeY), and information of maximum allowed ternary tree root node size(MaxTtSizeY).

In any method mentioned above, the partition constraint information comprises: N sets or groups of partition constraint information corresponding to N types of slices, or N sets or groups of partition constraint information corresponding to N indexes of slices, and wherein each set or group of partition constraint information comprises one or more selected from the following: information of minimum allowed quadtree leaf node size(MinQtSizeY), information of maximum multi-type tree depth(MaxMttDepth), information of maximum allowed binary tree root node size(MaxBtSizeY), and information of maximum allowed ternary tree root node size(MaxTtSizeY); wherein N is a positive integer.

The method may be comprising: partitioning a block of an image region according to partition constraint information; and generating a bitstream including a plurality of partition constraint syntax elements, wherein the plurality of partition constraint syntax elements indicate the partition constraint information, wherein the plurality of partition constraint syntax elements are signaled at a parameter set level or a header.

For example, the plurality of partition constraint syntax elements is signaled at any one of a video parameter set (VPS) level, a sequence parameter set (SPS) level, a picture parameter set (PPS) level, a picture header, a slice header or a tile header.

In some exemplary implementations, the partition constraint information comprises information of minimum allowed quadtree leaf node size(MinQtSizeY), information of maximum multi-type tree depth(MaxMttDepth), and information of maximum allowed binary tree root node size(MaxBtSizeY).

For instance, the partition constraint information comprises information of minimum allowed quadtree leaf node size(MinQtSizeY), information of maximum multi-type tree depth(MaxMttDepth), information of maximum allowed binary tree root node size(MaxBtSizeY), and information of maximum allowed ternary tree root node size(MaxTtSizeY).

In some embodiments, the partition constraint information comprises two or more selected from the following: information of minimum allowed quadtree leaf node size (MinQtSizeY), information of maximum multi-type tree depth(MaxMttDepth), information of maximum allowed binary tree root node size(MaxBtSizeY), and information of maximum allowed ternary tree root node size(MaxTtSizeY).

For example, the partition constraint information comprises: N sets or groups of partition constraint information corresponding to N types of slices, or N sets or groups of partition constraint information corresponding to N indexes of slices, and wherein each set or group of partition constraint information comprises two or more selected from the following: information of minimum allowed quadtree leaf node size(MinQtSizeY), information of maximum multi-type tree depth(MaxMttDepth), information of maximum allowed binary tree root node size(MaxBtSizeY), and information of maximum allowed ternary tree root node size (MaxTtSizeY); wherein N is a positive integer.

According to an embodiment, a method is provided of decoding implemented by a decoding device, comprising: parsing from a bitstream one or more partition constraint syntax elements, wherein the one or more partition constraint syntax elements indicate partition constraint information, wherein the one or more partition constraint syntax elements are obtained from a picture parameter set (PPS) level of the bitstream; and partitioning a block of an image region according to the partition constraint information.

In some implementations, the partition constraint information comprises one or more selected from the following: information of minimum allowed quadtree leaf node size (MinQtSizeY), information of maximum multi-type tree depth(MaxMttDepth), information of maximum allowed binary tree root node size(MaxBtSizeY), and information of maximum allowed ternary tree root node size(MaxTtSizeY).

For example, the partition constraint information comprises information of minimum allowed quadtree leaf node size(MinQtSizeY), information of maximum multi-type tree depth(MaxMttDepth), and information of maximum allowed binary tree root node size(MaxBtSizeY). The partition constraint information may comprise information of minimum allowed quadtree leaf node size(MinQtSizeY), information of maximum multi-type tree depth(MaxMttDepth), information of maximum allowed binary tree root node size(MaxBtSizeY), and information of maximum allowed ternary tree root node size(MaxTtSizeY).

In some embodiments, the partition constraint information comprises: N sets or groups of partition constraint information corresponding to N types of slices, or N sets or groups of partition constraint information corresponding to N indexes of slices, and wherein each set or group of partition constraint information comprises one or more selected from the following: information of minimum allowed quadtree leaf node size(MinQtSizeY), information of maximum multi-type tree depth(MaxMttDepth), information of maximum allowed binary tree root node size(MaxBtSizeY), and information of maximum allowed ternary tree root node size(MaxTtSizeY); wherein N is a positive integer.

According to an embodiment, a method is provided of decoding implemented by a decoding device, comprising: parsing from a bitstream a plurality of partition constraint syntax elements, wherein the plurality of partition constraint syntax elements indicate partition constraint information, wherein the plurality of partition constraint syntax elements are obtained from a parameter set level of the bitstream or a header of the bitstream; and partitioning a block of an image region according to the partition constraint information.

For example, the plurality of partition constraint syntax elements are obtained from any one of a video parameter set (VPS) level, a sequence parameter set (SPS) level, a picture parameter set (PPS) level, a picture header, a slice header or a tile header.

For example, the partition constraint information comprises information of minimum allowed quadtree leaf node size(MinQtSizeY), information of maximum multi-type tree depth(MaxMttDepth), and information of maximum allowed binary tree root node size(MaxBtSizeY).

In some embodiments, the partition constraint information comprises information of minimum allowed quadtree leaf node size(MinQtSizeY), information of maximum multi-type tree depth(MaxMttDepth), information of maximum allowed binary tree root node size(MaxBtSizeY), and information of maximum allowed ternary tree root node size(MaxTtSizeY).

In some implementations, the partition constraint information comprises two or more selected from the following: information of minimum allowed quadtree leaf node size (MinQtSizeY), information of maximum multi-type tree depth(MaxMttDepth), information of maximum allowed binary tree root node size(MaxBtSizeY), and information of maximum allowed ternary tree root node size(MaxTtSizeY).

For example, the partition constraint information comprises: N sets or groups of partition constraint information corresponding to N types of slices, or N sets or groups of partition constraint information corresponding to N indexes of slices, and wherein each set or group of partition constraint information comprises two or more selected from the following: information of minimum allowed quadtree leaf node size(MinQtSizeY), information of maximum multi-type tree depth(MaxMttDepth), information of maximum allowed binary tree root node size(MaxBtSizeY), and information of maximum allowed ternary tree root node size (MaxTtSizeY); wherein N is a positive integer.

In some examples, the partition constraint information comprises partition constraint information corresponding to different types of slice or corresponding to different indexes of slices.

For instance, the partition constraint information comprises partition constraint information in intra mode, and/or partition constraint information in inter mode.

In any of the embodiments, the image region comprises a picture or a part of the picture.

In some embodiments, when a value of a multi-type tree partition enabled flag from the picture parameter set(PPS) enables multi-type tree partition for the block, parsing partition constraint information from the picture parameter set and applying multi-type tree partition to the block of the image region according to the partition constraint information.

According to an embodiment, an encoder is provided comprising processing circuitry for carrying out any of the above methods.

According to an embodiment, a decoder is provided comprising processing circuitry for carrying out any of the above methods.

According to an embodiment, a computer program product is provided comprising a program code for performing the method according to any of the above methods.

According to an embodiment, a decoder is provided, comprising: one or more processors; and a non-transitory computer-readable storage medium coupled to the processors and storing programming for execution by the processors, wherein the programming, when executed by the processors, configures the decoder to carry out the method according to any of the above mentioned decoding methods.

According to an embodiment, an encoder is provided, comprising: one or more processors; and a non-transitory computer-readable storage medium coupled to the processors and storing programming for execution by the processors, wherein the programming, when executed by the processors, configures the encoder to carry out the method according to any of the above mentioned decoding methods.

According to a first aspect, embodiments of the invention relate to a method for decoding of a video bitstream implemented by a decoding device, wherein the video bitstream including data representing an image region and an image region header of the image region, the decoding method comprising:

Obtaining an override flag from the video bitstream;

When the value of the override flag (for example, partition_constraint_override_flag) is overriding value, obtaining first partition constraint information for the image region from the image region header;

Partitioning a block of the image region according to the first partition constraint information.

In a possible implementation, the partitioning a block of the image region according to the first partition constraint information comprises: partitioning a block of the image region into sub-blocks according to the first partition constraint information. The decoding method further comprises: reconstructing the sub-blocks.

In a possible implementation, wherein the decoding method further comprises:

Obtaining an override enabled flag from the video bitstream;

Wherein when the value of the override enabled flag (for example, partition_constraint_override_enabled_flag) is an enabling value, obtaining the override flag from the video bitstream.

In a possible implementation, the decoding method further comprises:

Obtaining a partition constraint control present flag from the video bitstream;

Wherein when the value of the partition constraint control present flag (for example, partition_constraint_control_present_flag) is true, obtaining the override enabled flag from the video bitstream.

In a possible implementation, the video bitstream further including data representing a parameter set of the video bitstream, and the value of the partition constraint control present flag is false specifies the absence of partition constraint control syntax elements in the parameter set.

In a possible implementation, the parameter set is picture parameter set or sequence parameter set.

In a possible implementation, the video bitstream further including data representing a parameter set of the video bitstream, and the decoding method further comprises:

When the value of the override enabled flag is a disabling value, partitioning the block of the image region according to second partition constraint information for the video bitstream from the parameter set.

In a possible implementation, the second partition constraint information comprises information of minimum allowed quadtree leaf node size, information of maximum multi-type tree depth, information of maximum allowed ternary tree root node size or information of maximum allowed binary tree root node size.

In a possible implementation, the second partition constraint information comprises partition constraint information corresponding to different parameters related to image regions or corresponding to different index.

In a possible implementation, the second partition constraint information comprises partition constraint information in intra mode, or partition constraint information in inter mode.

In a possible implementation, the second partition constraint information comprises partition constraint information for luma block, or partition constraint information for chroma block.

In a possible implementation, the video bitstream further including data representing a parameter set of the video bitstream, the obtaining an override enabled flag from the video bitstream comprises obtaining the override enabled flag from the parameter set.

In a possible implementation, the obtaining an override flag from the video bitstream comprises obtaining the override flag from the image region header.

In a possible implementation, the first partition constraint information comprises information of minimum allowed quadtree leaf node size, information of maximum multi-type tree depth, information of maximum allowed ternary tree root node size or information of maximum allowed binary tree root node size.

In a possible implementation, the image region comprises a slice or a tile, and the image region header comprises a slice header of the slice or a tile header of the tile.

In a possible implementation, wherein the video bitstream further including data representing a parameter set of the video bitstream, the decoding method further comprises:

When the value of the override flag is not the overriding value, partitioning the block of the image region according to second partition constraint information for the video bitstream from the parameter set.

In a possible implementation, when a value of a multi-type tree partition enabled flag (for example, slice_btt_enabled_flag) from the image region header enables multi-type tree partition for the block, obtaining first partition constraint information and applying multi-type tree partition to the block of the image region according to the first partition constraint information.

In a possible implementation, the video bitstream further including data representing a parameter set of the video bitstream, when the multi-type tree partition enabled flag from the image region header is not present and a value of a multi-type tree partition enabled flag (for example, sps_bt_t_enabled_flag) from the parameter set enables multi-type tree partition for the block enables multi-type tree partition for the block, obtaining second partition constraint information for the video bitstream from the parameter set and applying multi-type tree partition to the block of the image region according to the second partition constraint information.

According to a second aspect, embodiments of the invention relate to a method for decoding of a video bitstream implemented by a decoding device, wherein the video bitstream including data representing a block and a first parameter set of the video bitstream, the decoding method comprising:

Obtaining an override flag from the video bitstream;

When the value of the override flag is overriding value, obtaining first partition constraint information for the block from the first parameter set;

Partitioning the block according to the first partition constraint information.

In a possible implementation, wherein the partitioning the block according to the first partition constraint information comprises: partitioning the block into sub-blocks according to the first partition constraint information. The decoding method further comprises: reconstructing the sub-blocks.

In a possible implementation, wherein the decoding method further comprises:

Obtaining an override enabled flag from the video bitstream;

Wherein when the value of the override enabled flag is an enabling value, obtaining the override flag from the video bitstream.

In a possible implementation, wherein the decoding method further comprises:

Obtaining a partition constraint control present flag from the video bitstream;

Wherein when the value of the partition constraint control present flag is true, obtaining the override enabled flag from the video bitstream.

In a possible implementation, wherein the video bitstream further including data representing a second parameter set of the video bitstream, and the value of the partition constraint control present flag is false specifies the absence of partition constraint control syntax elements in the parameter set.

In a possible implementation, wherein the video bitstream further including data representing a second parameter set of the video bitstream, and the decoding method further comprises:

When the value of the override enabled flag is a disabling value, partitioning the block according to second partition constraint information for the video bitstream from the second parameter set.

In a possible implementation, the second partition constraint information comprises information of minimum allowed quadtree leaf node size, information of maximum multi-type tree depth, information of maximum allowed ternary tree root node size or information of maximum allowed binary tree root node size.

In a possible implementation, the second partition constraint information comprises partition constraint information corresponding to different parameters related to image regions represented by the video bitstream or corresponding to different index.

In a possible implementation, the second partition constraint information comprises partition constraint information in intra mode, or partition constraint information in inter mode.

In a possible implementation, the second partition constraint information comprises partition constraint information for luma block, or partition constraint information for chroma block.

In a possible implementation, wherein the video bitstream further including data representing a second parameter set of the video bitstream, the obtaining an override enabled flag from the video bitstream comprises obtaining the override enabled flag from the second parameter set.

In a possible implementation, the obtaining an override flag from the video bitstream comprises obtaining the override flag from the first parameter set.

In a possible implementation, the first partition constraint information comprises information of minimum allowed quadtree leaf node size, information of maximum multi-type tree depth, information of maximum allowed ternary tree root node size or information of maximum allowed binary tree root node size.

In a possible implementation, wherein the video bitstream further including data representing a second parameter set of the video bitstream;

Wherein first parameter set is a picture parameter set and the second parameter set is sequence parameter set.

In a possible implementation, wherein the video bitstream further including data representing a second parameter set of the video bitstream, the decoding method further comprises:

When the value of the override flag is not the overriding value, partitioning the block according to second partition constraint information for the video bitstream from the second parameter set.

In a possible implementation, wherein when a value of a multi-type tree partition enabled flag from the first parameter set enables multi-type tree partition for the block, obtaining first partition constraint information and applying multi-type tree partition to the block according to the first partition constraint information.

In a possible implementation, wherein the video bitstream further including data representing a second parameter set of the video bitstream, when the multi-type tree partition enabled flag from the first parameter set is not present and a value of a multi-type tree partition enabled flag from the second parameter set enables multi-type tree partition for the block enables multi-type tree partition for the block, obtaining second partition constraint information for the video bitstream from the second parameter set and applying multi-type tree partition to the block according to the second partition constraint information.

According to a third aspect, embodiments of the invention relate to a method for decoding of a video bitstream implemented by a decoding device, wherein the video bitstream including data a first image region and a first image region header of the first image region, the decoding method comprising:

Obtaining an override flag from the video bitstream;

When the value of the override flag is overriding value, obtaining first partition constraint information for the first image region from the first image region header;

Partitioning a block of the first image region according to the first partition constraint information.

In a possible implementation, wherein the partitioning the block of the first image region according to the first partition constraint information comprises: partitioning the block of the first image region into sub-blocks according to the first partition constraint information. The decoding method further comprises: reconstructing the sub-blocks.

In a possible implementation, wherein the decoding method further comprises:

Obtaining an override enabled flag from the video bitstream;

Wherein when the value of the override enabled flag is an enabling value, obtaining the override flag from the video bitstream.

In a possible implementation, wherein the decoding method further comprises:

Obtaining a partition constraint control present flag from the video bitstream;

Wherein when the value of the partition constraint control present flag is true, obtaining the override enabled flag from the video bitstream.

In a possible implementation, wherein the video bitstream further including data representing a second image region and a second image region header of the second image region, and the value of the partition constraint control present flag is false specifies the absence of partition constraint control syntax elements in the second image region header.

In a possible implementation, wherein the video bitstream further including data representing a second image region and a second image region header of the second image region, and the decoding method further comprises:

When the value of the override enabled flag is a disabling value, partitioning the block of the first image region according to second partition constraint information for the video bitstream from the second image region header, wherein the second image region comprises the block of the first image region.

In a possible implementation, the second partition constraint information comprises information of minimum allowed quadtree leaf node size, information of maximum multi-type tree depth, information of maximum allowed ternary tree root node size or information of maximum allowed binary tree root node size.

In a possible implementation, the second partition constraint information comprises partition constraint information corresponding to different parameters related to image regions represented by the video bitstream or corresponding to different index.

In a possible implementation, the second partition constraint information comprises partition constraint information in intra mode, or partition constraint information in inter mode.

In a possible implementation, the second partition constraint information comprises partition constraint information for luma block, or partition constraint information for chroma block.

In a possible implementation, wherein the video bitstream further including data representing a second image region and a second image region header of the second image region, the obtaining an override enabled flag from the video bitstream comprises obtaining the override enabled flag from the second image region header.

In a possible implementation, the obtaining an override flag from the video bitstream comprises obtaining the override flag from the first image region header.

In a possible implementation, the first partition constraint information comprises information of minimum allowed quadtree leaf node size, information of maximum multi-type tree depth, information of maximum allowed ternary tree root node size or information of maximum allowed binary tree root node size.

In a possible implementation, wherein the video bitstream further including data representing a second image region and a second image region header of the second image region;

Wherein the first image region header is a slice header and the second image region header is a tile header, and the first image region is a slice and the second image region is a tile, and the tile comprises the slice; or, The first image region header is a tile header and the second image region header is slice header, and the first image region is a tile and the second image region is a slice, and the slice comprises the tile.

In a possible implementation, wherein the video bitstream further including data representing a second image region and a second image region header of the second image region, the decoding method further comprises:

When the value of the override flag is not the overriding value, partitioning the the block of the first image region according to second partition constraint information for the video bitstream from the second image region header, wherein the second image region comprises the block of the first image region.

In a possible implementation, wherein when a value of a multi-type tree partition enabled flag from the first image region header enables multi-type tree partition for the block, obtaining first partition constraint information and applying multi-type tree partition to the block of the first image region according to the first partition constraint information.

In a possible implementation, wherein the video bitstream further including data representing a second image region header of the video bitstream, when the multi-type tree partition enabled flag from the first image region header is not present and a value of a multi-type tree partition enabled flag from the second image region header enables multi-type tree partition for the block enables multi-type tree partition for the block, obtaining second partition constraint information for the video bitstream from the second image region header and applying multi-type tree partition to the block of the image region according to the second partition constraint information.

According to a fourth aspect, embodiments of the invention relate to an apparatus for decoding a video stream includes a processor and a memory. The memory is storing instructions that cause the processor to perform the method according to the first aspect, the second aspect or the third aspect, or any possible embodiment of the first aspect, the second aspect or the third aspect.

According to a fifth aspect, a computer-readable storage medium having stored thereon instructions that when executed cause one or more processors configured to code video data is proposed. The instructions cause the one or more processors to perform a method according to the first aspect, the second aspect or the third aspect, or any possible embodiment of the first aspect, the second aspect or the third aspect.

According to an sixth aspect, embodiments of the invention relate to a computer program comprising program code for performing the method according to the first aspect, the second aspect or the third aspect, or any possible embodiment of the first aspect, the second aspect or the third aspect when executed on a computer.

Summarizing, the present disclosure provides an encoding and decoding apparatus, as well as an encoding and decoding method. In particular, the present disclosure relates to block partitioning and signaling the partitioning parameters in a bitstream. An override flag in an image region header indicates whether or not a block is to be partitioned according to a first partition constraint information. The override flag is included in the bitstream and the block is partitioned accordingly.

The invention claimed is:

1. A method for decoding a video bitstream implemented by a decoding device, wherein the video bitstream comprises an image region header of an image region and data representing the image region, the video bitstream further comprises a parameter set of the video bitstream, the method comprising:

obtaining an override flag from the video bitstream, wherein the override flag indicates whether first partition constraint information from the image region header or second partition constraint information from the parameter set is for partitioning a block of the image region;

when a value of the override flag is an overriding value, obtaining first partition constraint information for the image region from the image region header; partitioning a block of the image region into a plurality of sub-blocks according to the first partition constraint information;

when the value of the override flag is not the overriding value, partitioning the block of the image region into a plurality of sub-blocks according to second partition constraint information; and reconstructing the block of the image region by reconstructing the plurality of sub-blocks.

2. The method of claim 1, wherein the method further comprises:

obtaining an override enabled flag from the video bitstream, wherein obtaining the override flag from the video bitstream comprising: obtaining the override flag from the video bitstream when the value of the override enabled flag is an enabling value.

3. The method of claim 2, wherein the video bitstream further comprises data representing a parameter set of the video bitstream, and the method further comprises:

when the value of the override enabled flag is a disabling value, partitioning the block of the image region according to second partition constraint information for the video bitstream from the parameter set.

4. The method of claim 3, wherein the second partition constraint information comprises one or more of information of minimum allowed quadtree leaf node size, information of maximum multi-type tree depth, information of maximum allowed ternary tree root node size or information of maximum allowed binary tree root node size.

5. The method of claim 3, wherein the second partition constraint information comprises partition constraint information for blocks in the image region coded in an intra mode, or partition constraint information for blocks in the image region coded in an inter mode.

6. The method of claim 3, wherein the second partition constraint information comprises partition constraint information for luma blocks in the image region, or partition constraint information for chroma blocks in the image region.

7. The method of claim 2, wherein the video bitstream includes data representing a parameter set of the video bitstream, and obtaining the override enabled flag from the video bitstream comprises obtaining the override enabled flag from the parameter set.

8. The method of claim 1, wherein the override flag is from the image region header of the video bitstream.

9. The method of claim 1, wherein the first partition constraint information comprises one or more of information of minimum allowed quadtree leaf node size, information of maximum multi-type tree depth, information of maximum allowed ternary tree root node size or information of maximum allowed binary tree root node size.

10. The method of claim 1, wherein the image region comprises a slice, a tile, or a subpicture, and the image region header comprises a slice header of the slice, a tile header of the tile, or a header of the subpicture.

11. A method for encoding a video bitstream implemented by an encoding device, wherein the video bitstream comprises an image region header of an image region and data representing the image region, the video bitstream further comprises a parameter set of the video bitstream, the method comprising:
   determining whether to partition a block of the image region according to first partition constraint information in the image region header or second partition constraint information in the parameter set;
   responsive to determining to partition the block according to the first partition constraint information, partitioning the block of the image region according to the first partition constraint information and setting a value of an override flag to an overriding value;
   responsive to determining to partition the block according to the second partition constraint information, partitioning the block of the image region according to the second partition constraint information and setting a value of an override flag to a value which is not the overriding value; and
   encoding data representing the override flag into the video bitstream.

12. The method of claim 11 further comprising:
   determining whether partitioning the block according to the first partition constraint information is enabled for this block;
   when determining that partitioning the block according to first partition constraint information is enabled, setting a value of an override enabled flag to an enabling value; and
   encoding data representing the override enabled flag into the video bitstream,
   wherein determining whether to partition a block of the image region according to the first partition constraint information in the image region header is performed when determining that partitioning the block according to the first partition constraint information is enabled.

13. The method of claim 12, wherein the video bitstream further includes data representing a parameter set of the video bitstream, and the method further comprises:
   when determining that partitioning the block according to the first partition constraint information is not enabled, partitioning the block of the image region according to second partition constraint information for the video bitstream in the parameter set and setting the value of the override enabled flag to a disabling value.

14. The method of claim 13, wherein the second partition constraint information comprises one or more of information of minimum allowed quadtree leaf node size, information of maximum multi-type tree depth, information of maximum allowed ternary tree root node size or information of maximum allowed binary tree root node size.

15. The method of claim 13, wherein the second partition constraint information comprises partition constraint information for blocks in the image region that are coded in an intra mode, or partition constraint information for blocks in the image region that are coded in an inter mode.

16. The method of claim 13, the second partition constraint information comprises partition constraint information for luma blocks in the image region, or partition constraint information for chroma blocks in the image region.

17. The method of claim 12, wherein the video bitstream comprises data representing a parameter set for the video bitstream, and the parameter set comprises the override enabled flag.

18. The method of claim 11, wherein the override flag is in the image region header.

19. The method of claim 11, wherein the first partition constraint information comprises one or more of information of minimum allowed quadtree leaf node size, information of maximum multi-type tree depth, information of maximum allowed ternary tree root node size or information of maximum allowed binary tree root node size.

20. The method of claim 11, wherein the image region comprises a slice, a tile, or a subpicture, and the image region header comprises a slice header of the slice, a tile header of the tile, or a header of the subpicture.

21. A non-transitory computer-readable storage medium storing a video bitstream, wherein the video bitstream comprises an image region header of an image region and data representing the image region, the image region header that comprises data representing an override flag, the video bitstream further comprises a parameter set of the video bitstream, and the data representing the override flag is generated by:
   determining whether to partition a block of the image region according to first partition constraint information in the image region header or second partition constraint information in the parameter set;
   responsive to determining to partition the block according to the first partition constraint information, partitioning the block of the image region according to the first partition constraint information and setting a value of an override flag to an overriding value;
   responsive to determining to partition the block according to the second partition constraint information, partitioning the block of the image region according to the second partition constraint information and setting a value of an override flag to a value which is not the overriding value; and
   encoding data representing the override flag into the video bitstream.

22. A decoder, comprising:
   one or more processors; and
   a non-transitory computer-readable storage medium coupled to the one or more processors and storing programming for execution by the one or more processors, wherein the programming, when executed by the one or more processors, configures the decoder to carry out operations comprising:
   obtaining an override flag from a video bitstream, wherein the video bitstream comprises an image region header of an image region and data representing the image region, the video bitstream further comprises a parameter set of the video bitstream, wherein the override flag indicates whether first partition constraint information from the image region header or second partition constraint information from the parameter set is to be used for partitioning a block of the image region;
   when a value of the override flag is an overriding value, obtaining first partition constraint information for the image region from the image region header; partitioning a block of the image region into a plurality of sub-blocks according to the first partition constraint information;
   when the value of the override flag is not the overriding value, partitioning the block of the image region into a plurality of sub-blocks according to second partition constraint information; and reconstructing the block of the image region by reconstructing the plurality of sub-blocks.

23. An encoder, comprising:
one or more processors; and
a non-transitory computer-readable storage medium coupled to the one or more processors and storing programming for execution by the one or more processors, wherein the programming, when executed by the one or more processors, configures the encoder to carry out operations comprising:

determining whether to partition a block of an image region according to first partition constraint information in an image region header in a video bitstream or second partition constraint information in a parameter set of the video bitstream;

responsive to determining to partition the block according to the first partition constraint information, partitioning the block of the image region according to the first partition constraint information and setting a value of an override flag to an overriding value;

responsive to determining to partition the block according to the second partition constraint information, partitioning the block of the image region according to the second partition constraint information and setting a value of an override flag to a value which is not the overriding value; and encoding data representing the override flag into the video bitstream.

* * * * *